United States Patent
Imanishi et al.

(10) Patent No.: US 10,635,227 B2
(45) Date of Patent: Apr. 28, 2020

(54) IMAGE DISPLAY DEVICE

(71) Applicant: SHARP KABUSHIKI KAISHA, Sakai, Osaka (JP)

(72) Inventors: Seiji Imanishi, Sakai (JP); Motohiro Akiyama, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 39 days.

(21) Appl. No.: 16/004,219

(22) Filed: Jun. 8, 2018

(65) Prior Publication Data
US 2018/0356934 A1 Dec. 13, 2018

(30) Foreign Application Priority Data
Jun. 13, 2017 (JP) .................................. 2017-116178

(51) Int. Cl.
| | |
|---|---|
| *G06F 3/041* | (2006.01) |
| *G06F 3/0488* | (2013.01) |
| *G09G 5/14* | (2006.01) |
| *H04N 21/431* | (2011.01) |
| *G09G 5/00* | (2006.01) |

(Continued)

(52) U.S. Cl.
CPC ........ *G06F 3/0416* (2013.01); *G06F 3/04883* (2013.01); *G06F 3/04886* (2013.01); *G09G 5/003* (2013.01); *G09G 5/14* (2013.01); *H04N 21/4312* (2013.01); *G06F 2203/04803* (2013.01); *G09G 2354/00* (2013.01); *G09G 2370/20* (2013.01); *H04N 5/4403* (2013.01); *H04N 5/44591* (2013.01); *H04N 5/45* (2013.01)

(58) Field of Classification Search
None
See application file for complete search history.

(56) References Cited

U.S. PATENT DOCUMENTS

| | | | | |
|---|---|---|---|---|
| 2010/0302179 | A1* | 12/2010 | Ahn ...................... | G06F 1/1618 345/173 |
| 2012/0081277 | A1* | 4/2012 | de Paz .................. | G06F 1/1616 345/156 |

(Continued)

FOREIGN PATENT DOCUMENTS

| | | |
|---|---|---|
| JP | 2001-083950 A | 3/2001 |
| JP | 2006-084919 A | 3/2006 |
| JP | 2013-153410 A | 8/2013 |

*Primary Examiner* — Duane N Taylor, Jr.
(74) *Attorney, Agent, or Firm* — ScienBiziP, P.C.

(57) ABSTRACT

An image display device includes a video signal input section that receives a plurality of video signals, a display section that displays, on one or more display screens, an image(s) corresponding to a predetermined video signal(s), a touch detection section that detects a start position and touch release position of a user's touch operation and generates touch information composed of the touch start position and the touch release position, a storage section storing display screen information, a touched position acquisition section that acquires input detection information with reference to the touch information, an input operation judgment section that judges the user's touch operation with reference to the display screen information and the input detection information and determines a screen switching process associated in advance with the touch operation, and a display screen switching section that executes the screen switching process.

11 Claims, 21 Drawing Sheets

(51) Int. Cl.
*H04N 5/44* (2011.01)
*H04N 5/445* (2011.01)
*H04N 5/45* (2011.01)

(56) References Cited

U.S. PATENT DOCUMENTS

2013/0076591 A1* 3/2013 Sirpal .................... G06F 3/1438
　　　　　　　　　　　　　　　　　　　　　　345/1.3
2015/0253937 A1* 9/2015 Kim ...................... G06F 3/0488
　　　　　　　　　　　　　　　　　　　　　　715/765

* cited by examiner

FIG. 3

| INPUT TERMINAL NUMBER | SIGNAL TYPE INFORMATION |
|---|---|
| T1 | HDMI-01 |
| T2 | DSUB-01 |
| T3 | DVI-01 |
| T4 | HDMI-02 |
| T5 | HDMI-03 |
| T6 | NO INPUT |
| T7 | NO INPUT |
| T8 | DSUB-02 |

FIG. 5A

| | | |
|---|---|---|
| 37 — DISPLAY MODE | MULTIPLE SPLIT DISPLAY | |
| 38 — NUMBER OF SCREENS | 4 | |
| 39 — LAYOUT INFORMATION | | |
| DISPLAY SCREEN | INPUT TERMINAL | SIGNAL TYPE INFORMATION |
| G1 | T1 | HDMI-01 |
| G2 | T4 | HDMI-02 |
| G3 | T3 | DVI-01 |
| G4 | T2 | DSUB-01 |

| | |
|---|---|
| G1 HDMI-01 | G2 HDMI-02 |
| G3 DVI-01 | G4 DSUB-01 |

FIG. 5C

| | | |
|---|---|---|
| 37 — DISPLAY MODE | MULTIPLE SPLIT DISPLAY | |
| 38 — NUMBER OF SCREENS | 2 | |
| 39 — LAYOUT INFORMATION | | |
| DISPLAY SCREEN | INPUT TERMINAL | SIGNAL TYPE INFORMATION |
| G1 | T1 | HDMI-01 |
| G2 | T2 | DSUB-01 |

| | |
|---|---|
| G1 HDMI-01 | G2 DSUB-01 |

FIG. 6A

| No. | STARTING POINT POSITION P1 | ENDING POINT POSITION P2 | NUMBER OF TAPS | MOVEMENT DISTANCE | DIRECTION OF MOVEMENT | SCREEN POSITION DETERMINATION |
|---|---|---|---|---|---|---|
| 1 | G1 | G1 | 1 | 0 (MOVEMENT ABSENT) | — | SAME SCREEN |
| 2 | G1 | G4 | 1 | L1 (MOVEMENT PRESENT) | LOWER RIGHT | DIFFERENT SCREENS |
| 3 | G1 | G2 | 1 | L2 (MOVEMENT PRESENT) | HORIZONTAL RIGHT | DIFFERENT SCREENS |
| 4 | G2 | G2 | 1 | L3 (MOVEMENT PRESENT) | RIGHT OUTWARD | SAME SCREEN |
| 5 | G1 | G1 | 2 | L4 (MOVEMENT PRESENT) | OBLIQUE OPPOSITE DIRECTION | SAME SCREEN |
| 6 | G1 | G1 | 2 | L5 (MOVEMENT PRESENT) | HORIZONTAL OPPOSITE DIRECTION | SAME SCREEN |

FIG. 6B

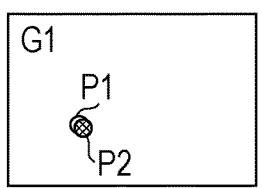

FIG. 6C

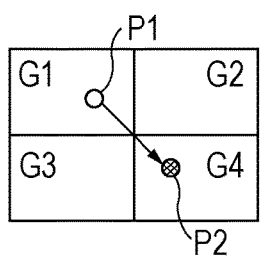

FIG. 6D

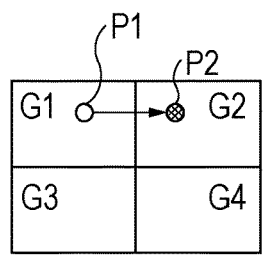

FIG. 6E

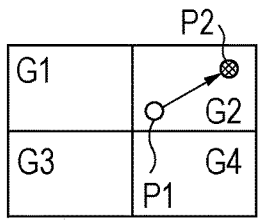

FIG. 6F

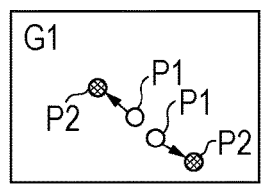

FIG. 6G

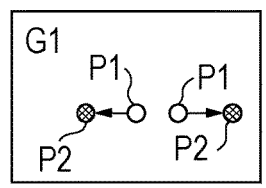

FIG. 7

| No. | CURRENT DISPLAY MODE | TOUCH OPERATION | NUMBER OF TAPS | PRESENCE OR ABSENCE OF MOVEMENT OF TOUCHED POSITION | | DIRECTION OF MOVEMENT OF TOUCHED POSITION | SCREEN POSITION DETERMINATION OF STARTING POINT AND ENDING POINT | | EXECUTION PROCESS |
|---|---|---|---|---|---|---|---|---|---|
| | | | | PRESENT | ABSENT | | SAME | DIFFERENT | |
| 1 | SINGLE-SCREEN | TAP | 1 | — | ○ | — | ○ | — | SWITCH TO FOUR-SCREEN DISPLAY |
| 2 | SINGLE-SCREEN | FLICK | 1 | ○ | — | DETECTED | ○ | — | SWITCH TO FOUR-SCREEN DISPLAY, DISPLAY IN DETECTED DIRECTION OF MOVEMENT |
| 3 | SINGLE-SCREEN | SWIPE | 2 | ○ | — | OBLIQUE DIRECTION | ○ | — | SWITCH TO TWO-SCREEN DISPLAY (PIP) |
| 4 | SINGLE-SCREEN | SWIPE | 2 | ○ | — | HORIZONTAL DIRECTION | ○ | — | SWITCH TO TWO-SCREEN DISPLAY (PBP) |
| 5 | FOUR-SCREEN | DOUBLE-TAP | 1 | — | ○ | — | ○ | — | SWITCH TO SINGLE-SCREEN DISPLAY, DISPLAY TAPPED IMAGE |
| 6 | FOUR-SCREEN | FLICK | 1 | ○ | — | DETECTED | — | ○ | CHANGE LAYOUT OF TWO SCREENS AT WHICH TOUCH STARTED AND ENDED |
| 7 | FOUR-SCREEN | FLICK | 1 | ○ | — | DETECTED (OUTWARD) | ○ | — | DISPLAY INPUT SIGNAL LIST MENU, SWITCH INPUT SIGNALS |
| 8 | TWO-SCREEN (PIP) | DOUBLE-TAP | 1 | — | ○ | — | ○ | — | SWITCH TO SINGLE-SCREEN DISPLAY, DISPLAY TAPPED IMAGE |
| 9 | TWO-SCREEN (PIP) | FLICK | 1 | ○ | — | — | — | ○ | INTERCHANGE LAYOUT OF TWO SCREENS |
| 10 | TWO-SCREEN (PIP) | FLICK | 1 | ○ | — | DETECTED (OUTWARD) | ○ | — | DISPLAY INPUT SIGNAL LIST MENU, SWITCH INPUT SIGNALS |
| 11 | TWO-SCREEN (PBP) | DOUBLE-TAP | 1 | — | ○ | — | ○ | — | SWITCH TO SINGLE-SCREEN DISPLAY, DISPLAY TAPPED IMAGE |
| 12 | TWO-SCREEN (PBP) | FLICK | 1 | ○ | — | — | — | ○ | INTERCHANGE LAYOUT OF TWO SCREENS |
| 13 | TWO-SCREEN (PBP) | FLICK | 1 | ○ | — | DETECTED (OUTWARD) | ○ | — | DISPLAY INPUT SIGNAL LIST MENU, SWITCH INPUT SIGNALS |

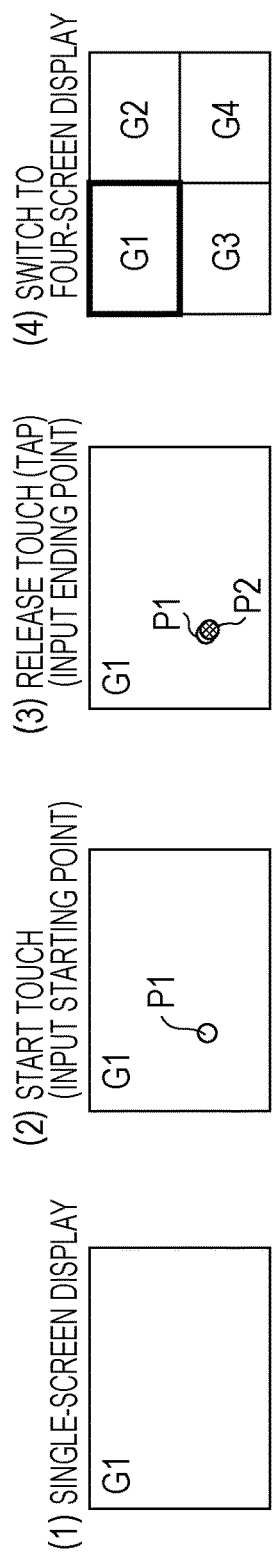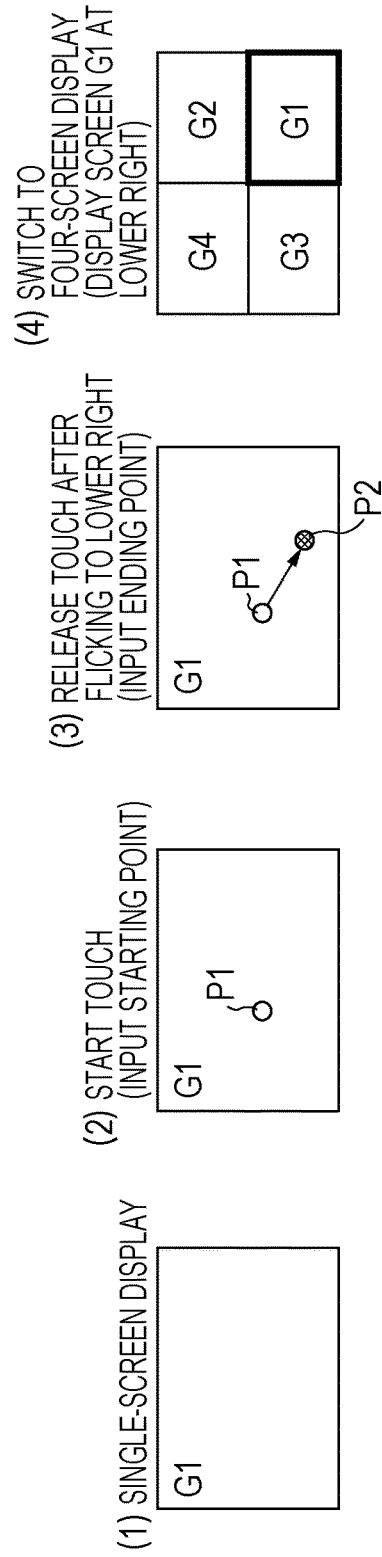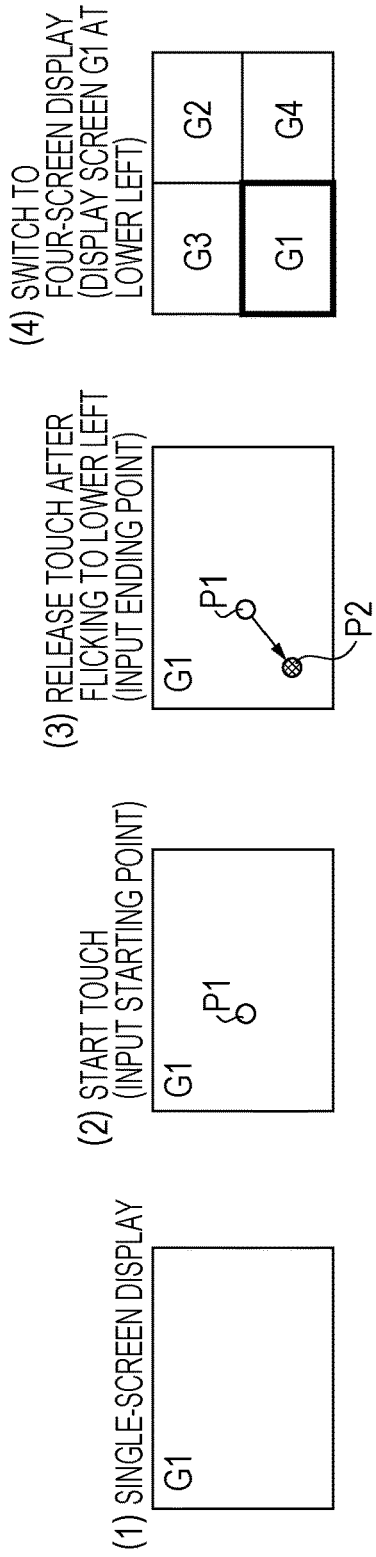

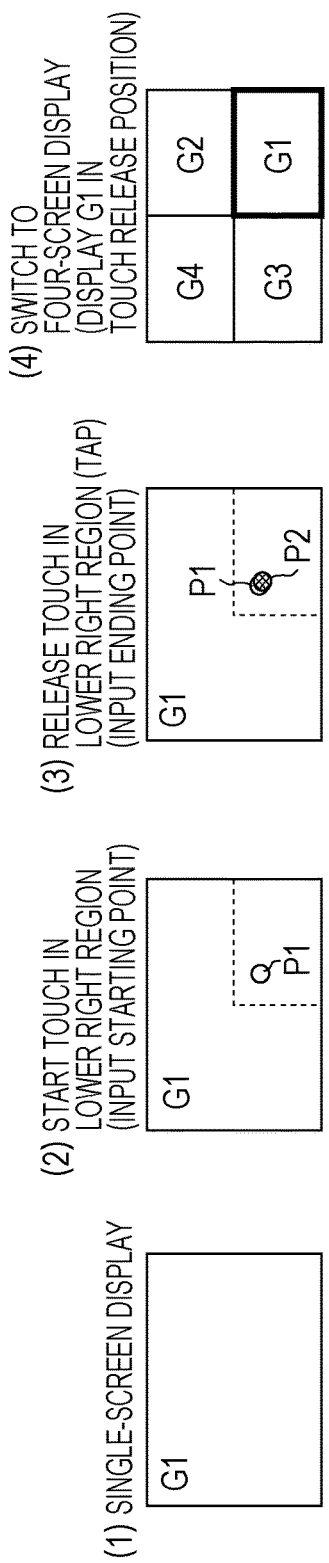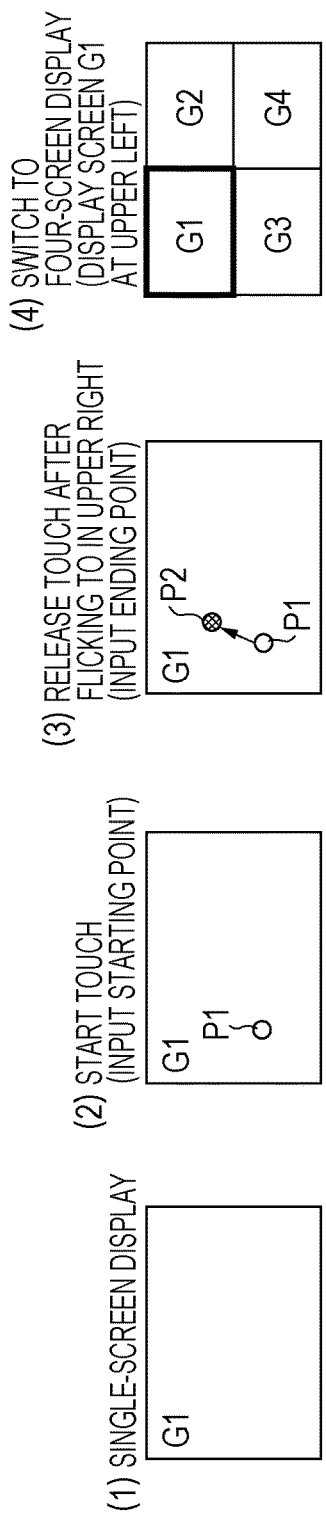

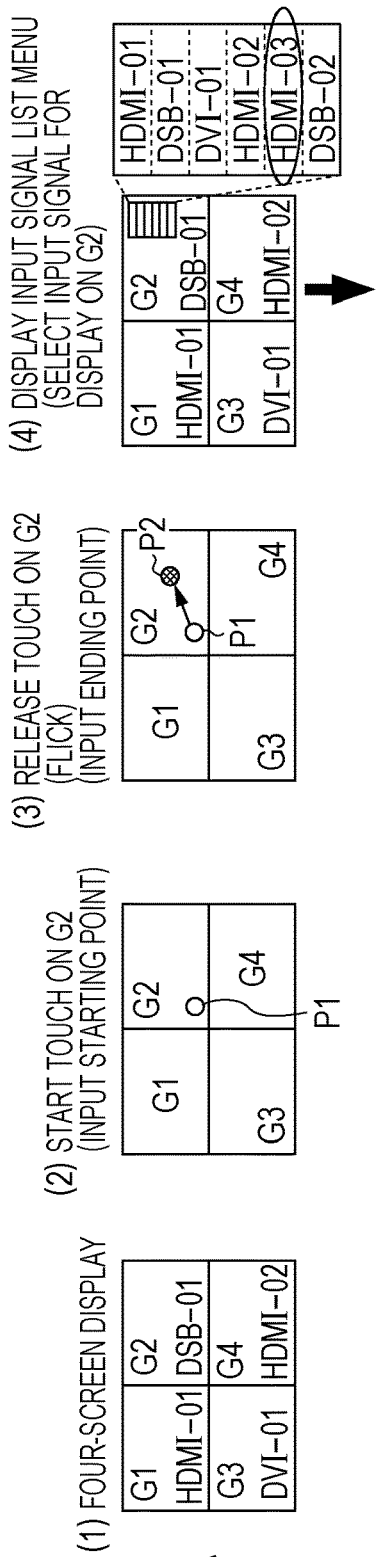
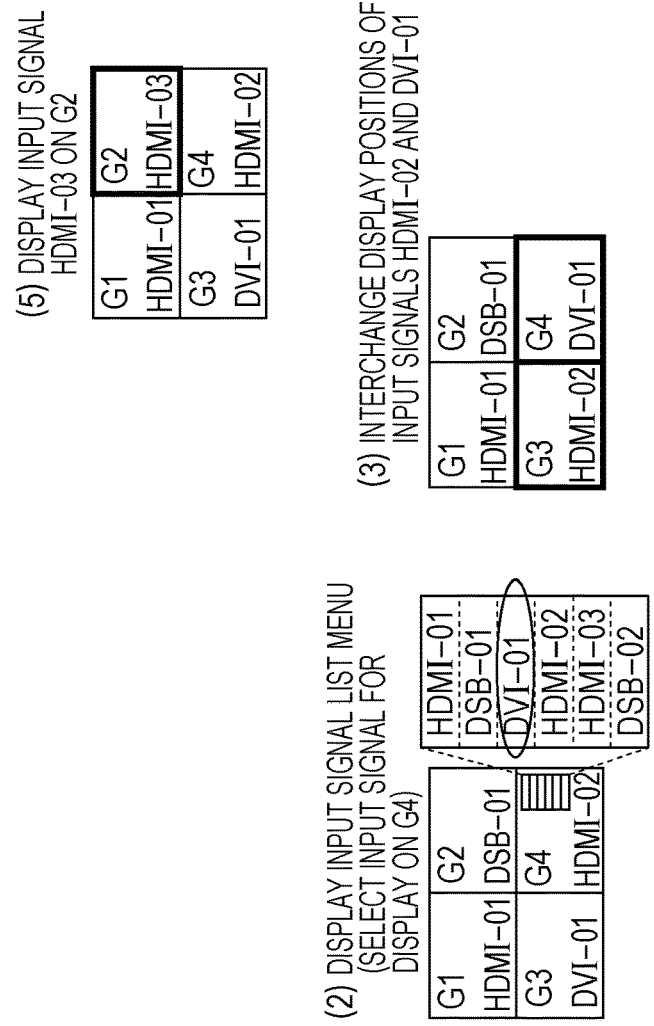
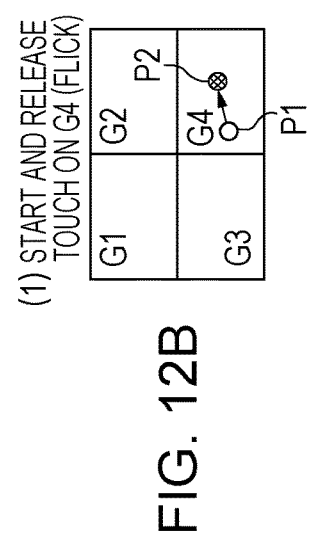
FIG. 12A
FIG. 12B

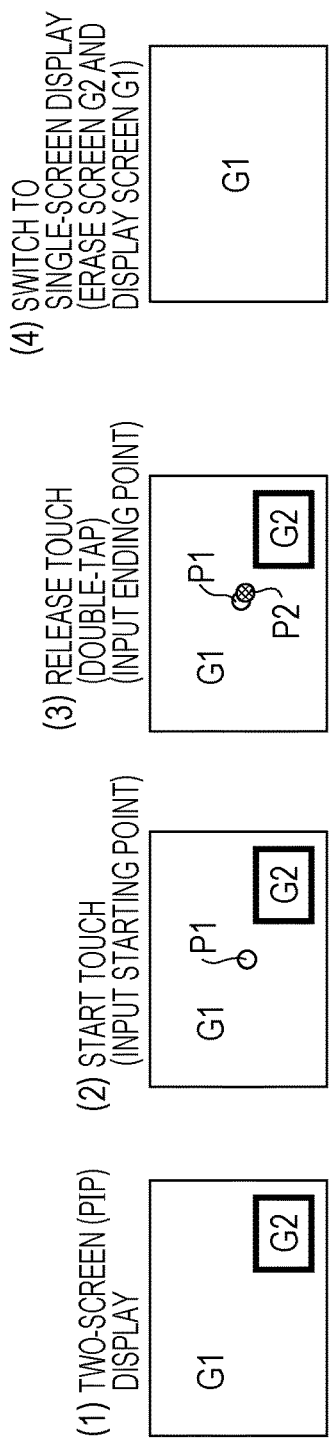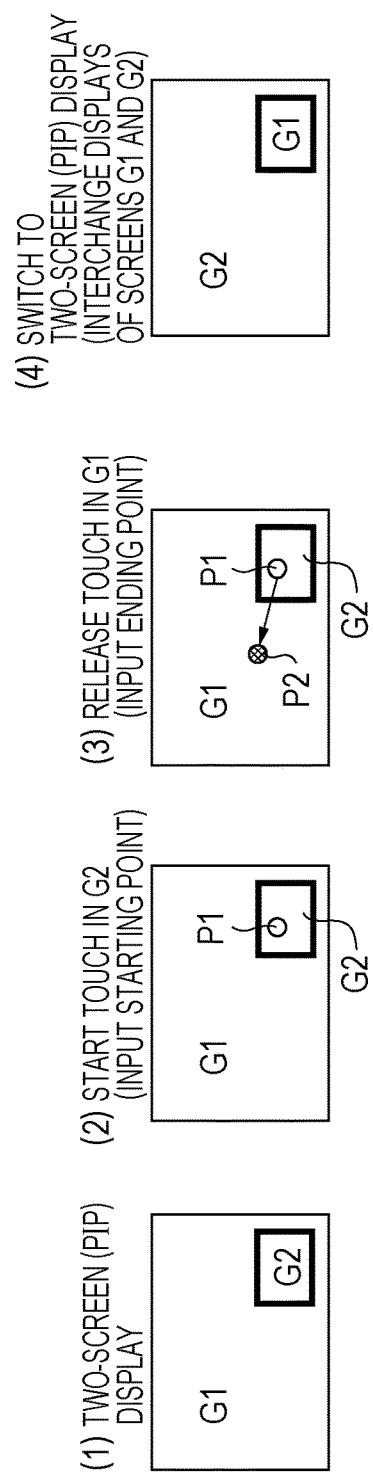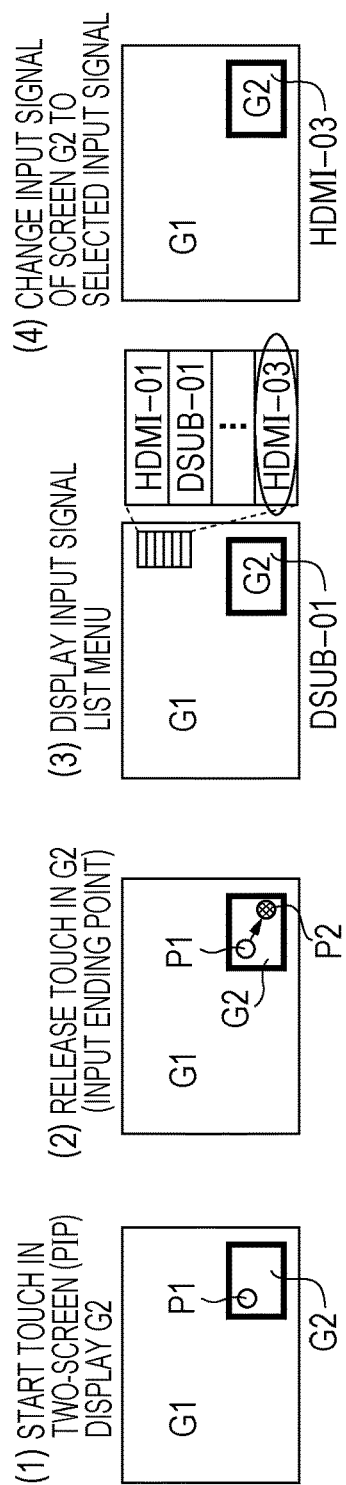

IMAGE DISPLAY DEVICE

BACKGROUND

1. Field

The present disclosure relates to image display devices and, in particular, to an image display device that has a multiwindow display function with which to receive a plurality of video signals and display, on a display screen of one display panel, a plurality of split screens on which predetermined images are displayed and that makes it possible to, by touching the display screen with a finger or the like, change the layout or the like of split screens that are simultaneously displayed.

2. Description of the Related Art

Conventionally, a display device has been utilized that has a multiple-screen simultaneous display function with which to receive a plurality of video signals and simultaneously display pictures on one display screen in accordance with the respective video signals. Further, a touch-panel display has been utilized in which one display screen is split into a plurality of display regions in each separate one of which different pictures are simultaneously displayed.

For example, Japanese Unexamined Patent Application Publication No. 2001-83950 proposes a touch panel display in which touching a desired one of a plurality of split display screens in order to select a desired moving image from among moving images being telecast on the plurality of split display screens, switching is made from telecasting the moving image on the area touched to telecasting the moving image in a full-screen display.

Further, Japanese Unexamined Patent Application Publication No. 2006-84919 proposes a navigation apparatus including a display panel that is capable of simultaneously displaying two screens consisting of a map and a TV picture. In a case where a touch operation of holding down a predetermined area on a display screen has been performed, switching between a two-screen display and a one-screen display is made. Further, in a case where a touch operation of pressing a predetermined area on a display screen has been performed, an enlarged display or reduced display of the framed one of the two screens is performed. Furthermore, in a case where, while a two-screen display is being performed, the boundary between the two screens has been held down or a central part of the display panel has been held down, the two screens exchange their display regions with each other.

Furthermore, Japanese Unexamined Patent Application Publication No. 2013-153410 proposes audiovisual equipment in which pictures are displayed in a plurality of split display regions, respectively of a display panel having a touch panel and, by performing a drag operation of selecting any of the split display regions of the touch panel and moving it into another split display region or an operation of selecting one destination from an OSD image displaying a menu showing a choice of destinations, the pictures displayed in the plurality of split display regions are interchanged.

However, an operation of switching between a one-screen display and a multiple-screen display or switching of the layout of a plurality of screens requires a user to cause a predetermined setting screen to be displayed and perform remote control with a remote controller or a predetermined key operation. This often requires complicated operations and imposes a heavy burden of operation on the user.

Further, even in a case of performing an operation for switching display screens or changing the layout with use of a touch panel, the user needs to memorize several different operations for the respective purposes. Since such operations are hard to intuitively understand, operating errors occur in some cases. This imposes a heavy burden of operation on the user.

SUMMARY

It is desirable to provide an image display device that makes it possible to lessen a burden of operation on a user by allowing the user to perform an intuitively easy-to-understand operation to perform a process of for example, switching the number of display screens or changing the layout of a plurality of split display screens.

According to an aspect of the disclosure, there is provided an image display device that is capable of performing a single-screen display and a multiple split display in which a plurality of screens are simultaneously displayed, including: a video signal input section including an input terminal through which to receive a plurality of video signals; a display section that displays, on a display screen, an image corresponding to a predetermined video signal inputted to the input terminal; a touch detection section that, in a case where a user has performed a touch operation, detects a position where a touch was started and a position where the touch was released and generates touch information composed of a touch start position and a touch release position; a storage section storing therein display screen information including layout information associating a video signal inputted to the input terminal and a position of one or more display screens currently displayed on the display section with each other; a touched position acquisition section that acquires, with reference to the touch information, input detection information including information indicating a position of that one of the one or more display screens currently displayed on the display section to which the touch start position and the touch release position belong and information indicating presence or absence of a movement of the user's touch operation; an input operation judgment section that judges the user's touch operation with reference to the display screen information and the input detection information thus acquired and determines a screen switching process associated in advance with the touch operation thus judged; and a display screen switching section that executes the screen switching process thus determined.

According to an aspect of the disclosure, there is provided a method of display in an image display device that is capable of performing a single-screen display and a multiple split display in which a plurality of screens are simultaneously displayed, including: receiving a plurality of video signals through an input terminal; displaying, on a display screen, an image corresponding to a predetermined video signal inputted to the input terminal; in a case where a user has performed a touch operation, detecting a position where a touch was started and a position where the touch was released and generating touch information composed of a touch start position and a touch release position; storing display screen information including layout information associating a video signal inputted to the input terminal and a position of one or more display screens currently displayed on a display section with each other; acquiring, with reference to the touch information, input detection information including information indicating a position of that one of the one or more display screens currently displayed on the display section to which the touch start position and the touch release position belong and information indicating presence or absence of a movement of the user's touch operation; judging the user's touch operation with reference to the display screen information and the input detection information thus acquired and determining a screen switching process associated in advance with the touch operation thus judged; and executing the screen switching process thus determined.

According to an aspect of the disclosure, there is provided a non-transitory recording medium storing thereon a computer program for causing a computer mounted in an image display device that is capable of performing a single-screen display and a multiple split display in which a plurality of screens are simultaneously displayed to execute a method including: receiving a plurality of video signals through an input terminal; displaying, on a display screen, an image corresponding to a predetermined video signal inputted to the input terminal; in a case where a user has performed a touch operation, detecting a position where a touch was started and a position where the touch was released and generating touch information composed of a touch start position and a touch release position; storing display screen information including layout information associating a video signal inputted to the input terminal and a position of one or more display screens currently displayed on a display section with each other; acquiring, with reference to the touch information, input detection information including information indicating a position of that one of the one or more display screens currently displayed on the display section to which the touch start position and the touch release position belong and information indicating presence or absence of a movement of the user's touch operation; judging the user's touch operation with reference to the display screen information and the input detection information thus acquired and determining a screen switching process associated in advance with the touch operation thus judged; and executing the screen switching process thus determined.

BRIEF DESCRIPTION OF THE DRAWINGS

FIG. 3 is an explanatory diagram of an example of video signal information that is stored in the storage section according to the embodiment of the present disclosure;

FIGS. 5A to 5D are explanatory diagrams of examples of display screen information that is stored in the storage section according to the embodiment of the present disclosure;

FIG. 6A to 6G are explanatory diagrams of examples of input detection information that is stored in the storage section according to the embodiment of the present disclosure;

FIG. 7 is an explanatory diagram of examples of operation judgment information that is stored in the storage section according to the embodiment of the present disclosure;

FIGS. 8A to 8C each illustrate explanatory diagrams of an example of an operation for switching from a single-screen display to a four-screen display;

FIGS. 9A and 9B each illustrate explanatory diagrams of an example of an operation for switching from a single-screen display to a four-screen display;

FIGS. 12A and 12B each illustrate explanatory diagrams of an example of an operation for selectively inputting input signals for display on split screens in a four-screen display;

FIGS. 13A to 13C each illustrate explanatory diagrams of an example of an operation for switching from a two-screen display (PIP) to a single-screen display, an operation for changing the layout of two split screens, or a similar operation;

DESCRIPTION OF THE EMBODIMENTS

In the following, an embodiment of the present disclosure is described with reference to the drawings. It should be noted that the present disclosure is not limited by the following description of examples.

Configuration of Image Display Device

Figure 1:
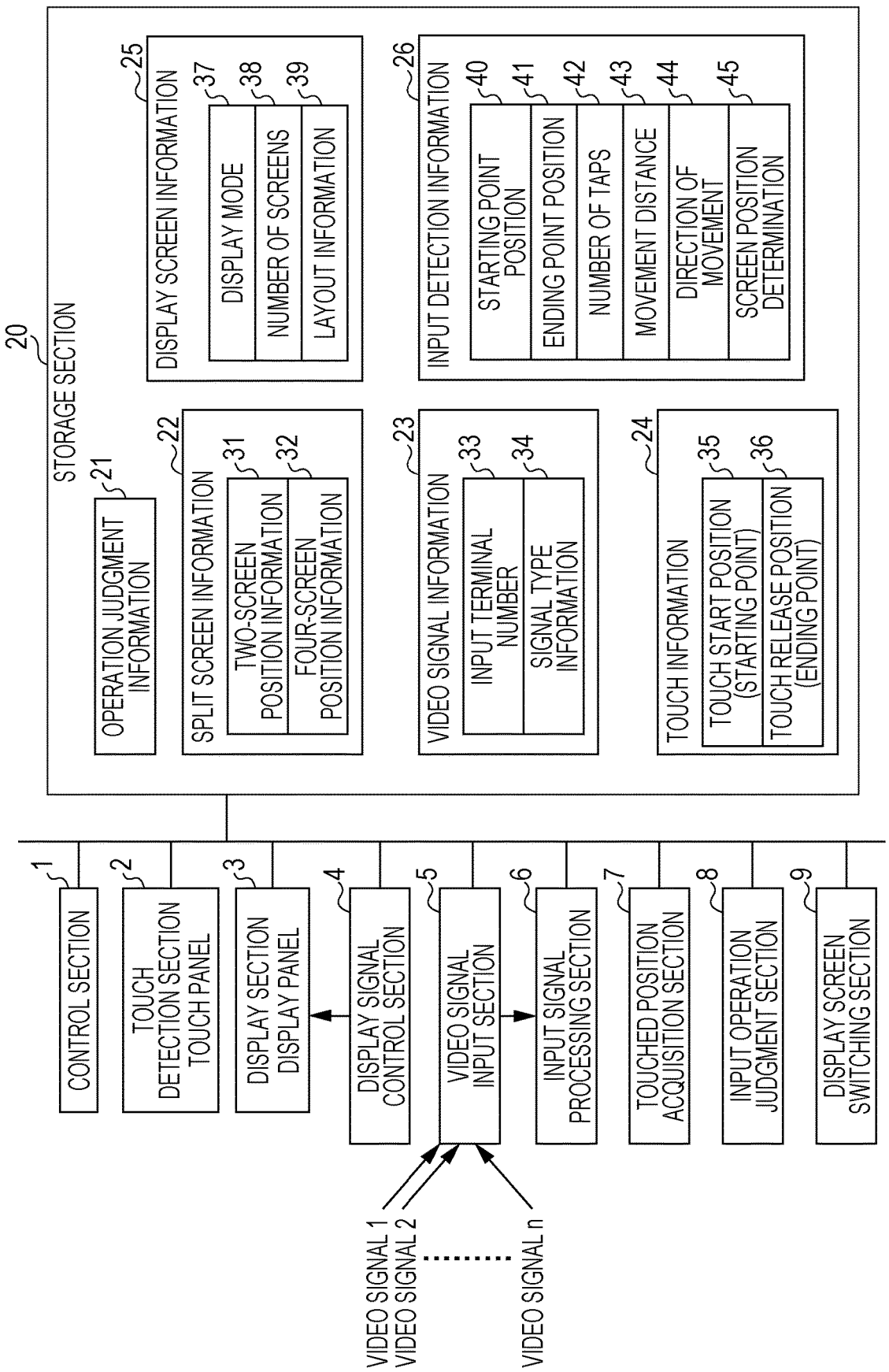
FIG. 1 is a block diagram of a configuration of an example of an image display device according to an embodiment of the present disclosure.

FIG. 1 is a block diagram of a configuration of an example of an image display device according to an embodiment of the present disclosure.

The image display device according to the embodiment of the present disclosure is a display device that is capable of performing a single-screen display and a multiple split display in which a plurality of screens are simultaneously displayed and that includes a display panel which displays an image and a touch panel through which to input information on a position touched by an input pen, a finger, or the like.

The display panel and the touch panel are placed on top of each other or integrally molded. The image display device according to the embodiment of the present disclosure is equivalent, for example, to a tablet terminal, a smartphone, an electronic black board, an information display, a touch table, a laptop PC, a car navigation, any of various types of touch display, or the like.

As shown in FIG. 1, the image display device according to the embodiment of the present disclosure mainly includes a control section 1, a touch detection section 2, a display section 3, a display signal control section 4, a video signal input section 5, an input signal processing section 6, a touched position acquisition section 7, an input operation judgment section 8, a display screen switching section 9, and a storage section 20.

The control section 1 is a section that controls an operation of each constituent element such as the touch detection section 2, and is realized by a microcomputer mainly including a CPU, a ROM, a RAM, an I/O controller, a timer, and the like.

The CPU makes various types of hardware organically operate in accordance with a control program stored in advance in the ROM or the like and thereby executes a touch detection function, a display screen switching function, or other functions of the image display device according to the embodiment of the present disclosure.

The touch detection section 2 is a section, equivalent to the touch panel, that, in a case where a user has performed a touch operation with an input pen, a finger, or the like, detects a position where a touch was started and a position where the touch was released and generates touch information (touched position coordinates) composed of a touch start position and a touch release position.

Since, in a case where a finger or the like has been brought into touch with the touch panel, a signal corresponding to the position touched is outputted, the coordinates of the touch start position is detected by confirming the signal.

Further, since the signal corresponding to the touched position is no longer outputted in a case where the finger or the like is brought out of touch with the touch panel, the coordinates of the touched position having been detected immediately before is detected as the coordinates of the touch release position in a case where it has been confirmed that the signal is no longer detected.

Information acquired on a touched position is stored as touch information 24 in the storage section 20.

Graphics or characters can be inputted by touching the touch panel with an input pen or the like. However, the following examples describe cases where by touching the touch panel with a finger or the like, the user performs an operation of changing the number of screens that are displayed on the display panel, the layout of split display screen, or the like.

The display section 3 is a section, equivalent to the display panel, that displays an image based on a video signal inputted from an external information processing device or the like. The display section 3 displays, on one or more display screens of one display panel, an image(s) corresponding to a predetermined video signal (s) inputted to an input terminal.

A usable example of the display panel is a liquid crystal panel, an organic EL panel, or the like.

The display signal control section 4 is a section that generates a display signal that is supplied to the display section 3. For example, in a case where one video signal is inputted, a display signal based on the video signal is generated and supplied to the display section 3. Further, for example, in a case where a plurality of video signal are inputted and images based on four of the video signals are split-displayed on the display section 3, display signals are generated and supplied to the display section 3 so that the respective images based on the four video signals can be displayed in predetermined screen positions.

The video signal input section 5 is a section, including an input terminal through which to receive a plurality of video signals, that receives one or more video signals based on a predetermined standard from the external information processing device or the like.

In order to receive a plurality of video signals (1 to n), the input terminal includes a plurality of the input terminals that are connected to the external information processing device via cables conforming to the predetermined standard. Examples of terminals through which to receive video signals include RGB terminals, DSUB terminals, D terminals, DVI terminals, HDMI (registered trademark) terminals, and the like, and it depends on design specifications how many of which terminals to include video signal that is inputted to an input terminal is hereinafter also simply referred to as "input signal".

The input signal processing section 6 is a section that converts a video signal which is inputted from an input terminal of the video signal input section 5 into a signal for display on the display section 3, and supplies the signal to the display signal control section 4. Further, the input signal processing section 6 stores, in the storage section 20, video signal information 23 associating an input terminal number and signal type information with each other.

The touched position acquisition section 7 is a section that acquires, with reference to touch information (touched position coordinates) detected by the touch detection section 2, input detection information 26 including information indicating the position of that one of one or more display screens currently displayed on the display section 3 to which the touch start position and the touch release position belong and information (such as a distance or direction of movement of the touched position) indicating the presence or absence of a movement of the user's touch operation.

As will be mentioned later, a screen switching process of, for example, changing the number of display screens or changing the layout of split display screens is performed with reference to the position of a split display screen touched, the presence or absence of a movement or the direction of movement of the touched position, and the like.

The input operation judgment section 8 is a section that judges, with reference to display screen information 25 stored in the storage section 20 and the input detection information 26 acquired, a touch operation (gesture) that the user has performed and determines a screen switching process associated in advance with the touch operation thus judged.

In particular, with reference to the information indicating the position of the display screen to which the touch start position and the touch release position belong, the presence or absence of the movement of the touch operation as detected from the touch start position and the touch release position, and the direction of movement of the touch operation as detected from the direction of a straight line extending from the touch start position to the touch release position, the input operation judgment section 8 may judge the touch operation that the user has performed.

As will be mentioned later, for example, in a case where the user has performed a tap operation of touching and releasing the touch panel at the same position in a single-screen display state, the input operation judgment section 8 judges that the user has performed a touch operation (gesture) for switching to a four-screen display.

Further, the input operation judgment section 8 may search for operation judgment information 21 stored in advance in the storage section 20 and determine a screen switching process associated in advance with the number of screens currently displayed on the display section 3 and the touch operation thus judged.

The display screen switching section 9 is a section that executes the screen switching process determined by the input operation judgment section 8.

This screen switching process may include a number-of-display-screens changing process of changing the number of screens that are displayed on the display section 3, a display position changing process of changing the positions of a plurality of split display screens displayed on the display section 3, and a switching process of switching video signals in order to change from displaying one image to displaying another image on the display screen.

For example, the display screen switching section 9 executes processes such as switching from a single-screen display to a four-screen display, switching from a single-display screen to a two-display screen, switching from a four-screen display to a single-screen display, a change of the layout of split display screens in a case where a four-screen display is being performed, and switching from one input signal to another for display on a split display screen.

The storage section 20 is a section in which to store information and programs that are needed to execute each function of the image display device. A usable example of the storage section 20 is a semiconductor storage element such as a ROM, a RAM, or a flash memory, a storage device such as an HDD or an SSD, or another storage medium.

In the ROM, a program is stored. In the RAM, information that is temporarily utilized is stored. Information that is configured in advance is stored in a nonvolatile rewritable storage element such as a flash memory.

In the storage section 20, the operation judgment information 21, split screen information 22, the video signal information 23, the touch information 24, the display screen information 25, and the input detection information 26 are mainly stored.

The operation judgment information. 21 is information for judging a touch operation (also referred to as "gesture") that the user has per and determining a screen switching process corresponding to the touch operation. Examples of the operation judgment information 21 are shown in FIG. 7, which will be described later.

The split screen information 22 is obtained by, in a case where a plurality of split display screens are displayed on the display panel, storing information specifying the position of each of the split display screens. The split screen information 22 is utilized in determining which split display screen the position touched belongs to a display region of.

For example, in a case where two-screen splitting and four-screen splitting are performed as split displays, two-screen position information 31 and four-screen position information 32 are stored in advance in the split screen information 22. Further, in a case where an n-screen split display (where n=3 n>4) is performed apart from two-screen splitting and four-screen splitting, n-screen position information is stored.

Figure 2A:
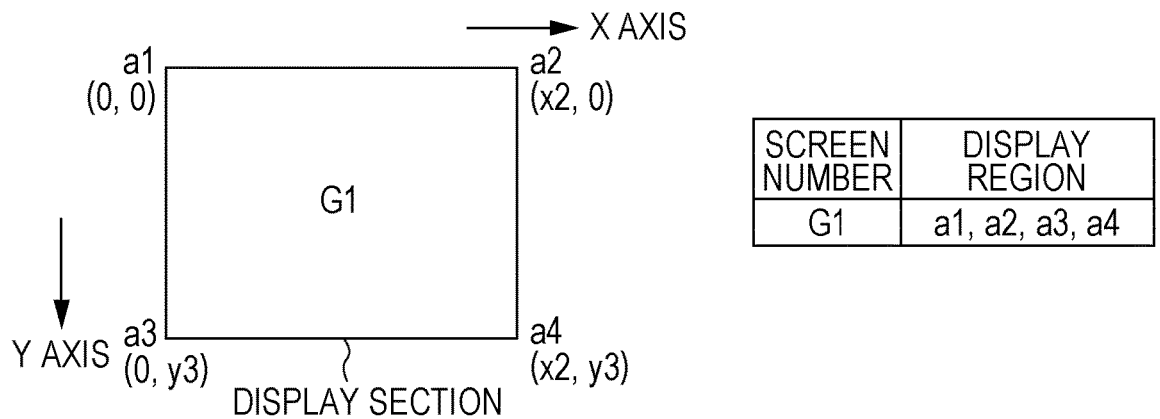
FIGS. 2A to 2C are explanatory diagrams of examples of split screen information that is stored in a storage section according to the embodiment of the present disclosure.
Figure 2B:
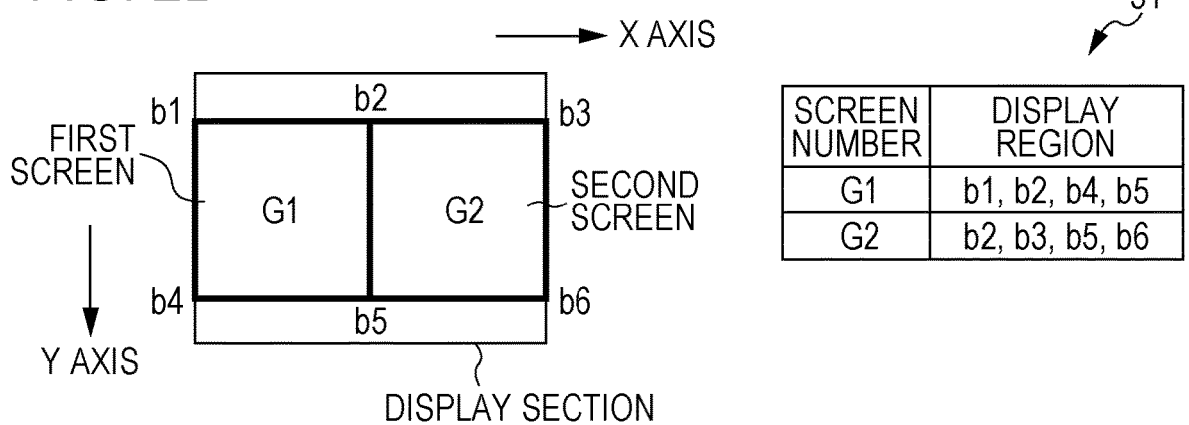
Figure 2C:
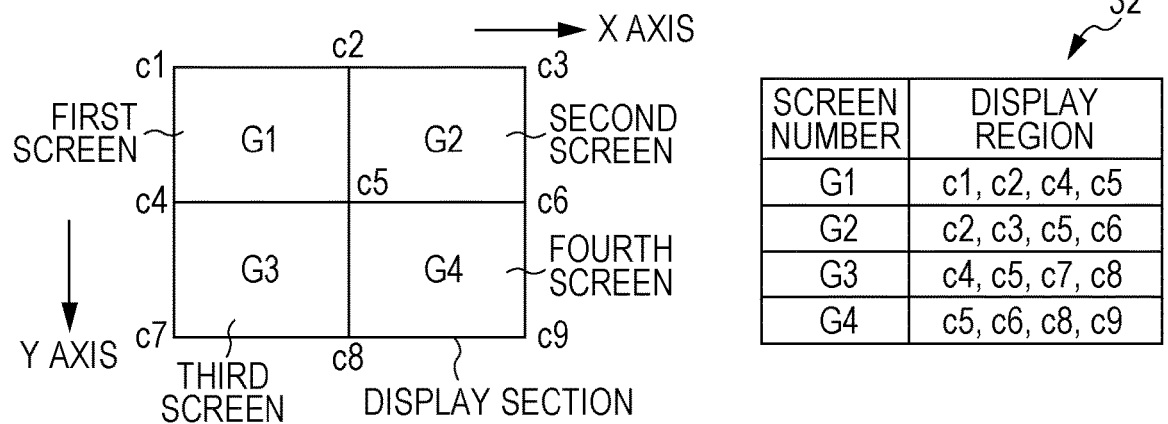

FIGS. 2A to 2C illustrate explanatory diagrams of examples of the split screen information 22. FIG. 2A shows a case (single-screen display) where one screen is displayed on the entire display section 3. In this case, assuming that the display section 3 is in the shape of a rectangle, the single screen is displayed in a region surrounded by the four vertices (a1, a2, a3, a4) of the rectangle. Assuming that the upper left vertex a1 of the display section 3 is a point of origin of X-Y coordinates whose X axis extends in a transverse direction and whose Y axis extends in a longitudinal direction, the four vertices are expressed, for example, by a1 (0, 0), a2 (x2, 0), a3 (0, y3), a4 (x2, y3), respectively.

Assuming that the screen number of the single screen is G1, an image based on one predetermined input signal is displayed on the screen G1 in the display region surrounded by the four vertices (a1, a2, a3, a4). In a case where the display panel and the touch panel are placed on top of each other, there is a one-to-one correspondence between the X-Y coordinates of a position on the display panel and the X-Y coordinates of a touched position on the touch panel.

FIG. 2B shows a case (two-screen display) where two screens are displayed on the display section 3. In this case, the two screens (first screen G1, second screen G2) are laid side by side in a transverse direction (X-axis direction). Such a display of two screens laid side by side in a transverse direction is referred to as "PBP (picture-by-picture) display".

Further, as shown in (1) of FIG. 13A, which will be described later, a two-screen display in which one screen G1 is displayed on the entire display section 3 and a screen G2 having a slightly small display region is simultaneously displayed over a portion of the display region of the screen G1 displayed on the entire display section 3 is referred to as "PIP (picture-in-picture) display".

In FIG. 2B, the first screen G1 is a region surrounded by the four vertices (b1, b2, b4, b5) of a rectangle, and the second screen G2 is a region surrounded by the four vertices (b2, b3, b5, b6) of a rectangle.

In a case where a two-screen display is performed, the two-screen position information 31 is stored as the split screen information 22. In the two-screen position information 31, for example, the screen number and the X-Y coordinates of the four vertices representing the display region of each split screen are stored for each split display screen.

Further, in a case where the coordinates of a touched position on the touch panel lie within the display region of the first screen G1, the touched position is judged to be on the first screen G1 of the two-screen display.

FIG. 2C shows a case (four-screen display) where four screens are display in the display section 3. In this example, the four screens (first screen G1, second screen G2, third screen G3, fourth screen G4) are split-displayed in transverse and longitudinal directions. In a case where a four-screen display is performed, the four-screen position information 32 is stored as the split screen information 22. In the four-screen position information 32, for example, the screen number and the X-Y coordinates of the four vertices representing the display region of each split screen are stored for each split display screen.

Further, in a case where the coordinates of a touch start position (starting point) on the touch panel lie within the display region of the fourth screen G4, the touch start position (starting point) is judged to be on the fourth screen. G4, and in a case where the coordinates of a touch release position (ending point) lie within the display region of the third screen G3, the touch release position (ending point) is judged to be on the third screen G3.

Further, in a case where an n-screen display other than a two-screen display and a four-screen display is performed, the n-screen position information needs only be similarly stored in advance in the storage section 20. It should be noted that although the split screen information 22 needs only be stored as a fixed value, the user may be allowed to uniquely reconfigure the settings for the size and placement of each split display screen.

The video signal information 23 is information for identifying a video signal that is inputted from an outside source and, for example, is information including an input terminal number 33 and signal type information 34.

FIG. 3 is an explanatory diagram of an example of the video signal information 23. The input terminal number 33 is a number for identifying a terminal through which to receive a video signal. The signal type information. 34 is information indicating the type of a video signal being inputted.

FIG. 3 shows, for example, that a video signal HDMI-01 is being inputted to an input terminal whose input terminal number 33 is T1.

The touch information 24 is information regarding a touched position on the touch panel and includes information 35 indicating a position where the user touched the touch panel (such a position being hereinafter referred to as "touch start position" or "starting point") and information 36 indicating a position where the user released his/her touch on the touch panel (such a position being hereinafter referred to as "touch release position" or "ending point").

In a case where the user touches the touch panel with a finger, the touch start position (starting point) 35 is the X-Y coordinates of a position that the user's finger touched first and the touch release position (ending point) 36 is the X-Y coordinates of a position where the user brought his/her finger out of touch with the touch panel.

Figure 4A:
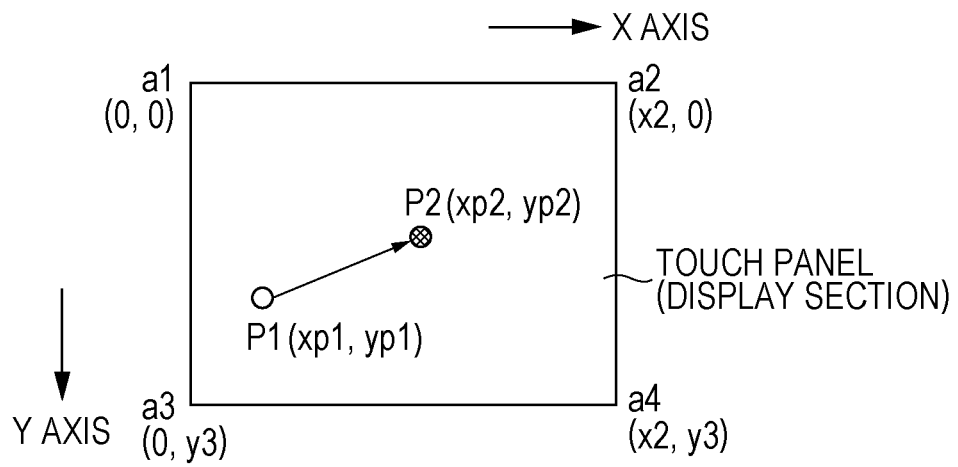
FIGS. 4A and 4B are explanatory diagrams of an example of touch information that is stored in the storage section according to the embodiment of the present disclosure.
Figure 4B:
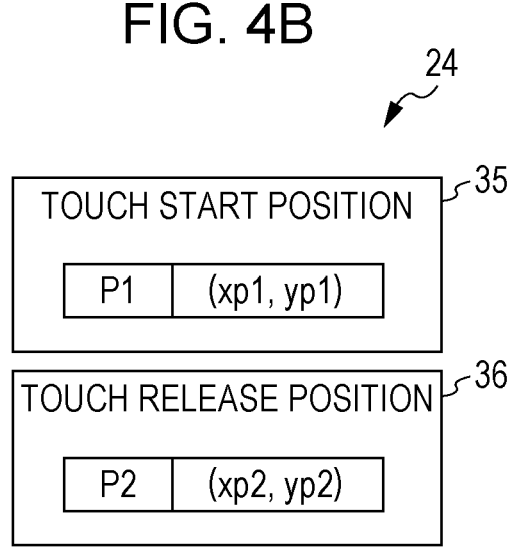

FIGS. 4A and 4B illustrate explanatory diagrams of an example of the touch information 24. FIG. 4A is an explanatory diagram of an example of a touch start position (stating point) and a touch release position (ending point) on the touch panel. FIG. 4A assumes that P1 is the touch start position (stating point) and P2 is the touch release position (ending point). That is, FIG. 4A assumes that the user brings his/her finger into touch with the touch panel at the position P1 (xp1, yp1), moves his/her finger while keeping it in touch with the touch panel, and releases the finger touch (brings his/her finger out of touch) at the position P2 (xp2, yp2).

Further, assuming that X-Y coordinates on the touch panel are also expressed by the same X-Y coordinates as the X-Y coordinates of the display region surrounded by the four vertices (a1, a2, a3, a4) shown in FIG. 2A, detected position coordinates are also equivalent to display coordinates on the display panel. In this case, as shown in FIG. 4B, the coordinates (xp1, yp1) of the touch start position (starting point) P1 and the coordinates (xp2, yp2) of the touch release position (ending point) P2 are stored as the touch information 24.

The display screen information 25 is information storing information regarding a screen currently displayed on the display panel and a relationship between a display screen and an input terminal and, for example, is information including a display mode 37, a number of screens 38, and layout information 39.

The display mode 37 is information identifying whether a screen currently displayed on the display section is a single-screen display or a multiple split display. In a case where a single-screen display is being performed as shown in FIG. 2A, the display mode 37 is set as information meaning "single-screen display", and in a case where a two-screen display or a four-screen display is being performed as shown in FIG. 2B or 2C, the display mode 37 is set as information meaning "multiple split display".

The number of screens 38 is information indicating the number of screens currently displayed on the display section 3. For example, in a case where multiple split screens are displayed and in case where a four-screen display is being performed, the number of screens 38 is set at 4. In a case where a two-screen display is being performed, the number of screens 38 is set at 2. In a case where a single-screen display is being performed, the number of screens 38 needs only be set at 1.

The layout information 39 is information associating a video signal inputted to the input terminal and the position of one or more display screens currently displayed on the displays section 3 with each other, and is information indicating which screen is displaying an image and on which video signal the image is based.

The layout information 39 is composed, for example, of a display screen number, an input terminal number, and signal type information.

FIGS. 5A to 5D illustrate explanatory diagrams of examples of the display screen information 25.

FIGS. 5A and 5B show an example of the display screen information 25 in a case where a four-screen display is currently performed, and FIGS. 5C and 5D show an example of the display screen information 25 in a case where a two-screen display is currently performed. The layout information 39 of FIG. 5A shows set values in a case where a four-screen display is being performed as shown in FIG. 5B. In the case of FIG. 5A, the display mode 37 is "multiple split display" and the number of screens 38 is 4.

Further, as shown in FIG. 5B, for example, in a case where an image based on the video signal HDMI-01 being inputted to the input terminal T1 is currently displayed on the upper left display screen G1, the number G1 of the display screen, the number T1 of the input terminal, and the signal type information HDMI-01 are stored in association with one another as the layout information 39. Similarly, in a case where an image based on a video signal HDMI-02 being inputted to an input terminal T4 is currently displayed on the upper right display screen G2, the number G2 of the display screen, the number T4 of the input terminal, and the signal type information HDMI-02 are stored in association with one another as the layout information 39. Further, for the lower left display screen G3 and the lower right display screen G4, too, display screen numbers, input terminal numbers, and signal type information are stored in association with one another, respectively.

The layout information 3 of FIG. 5C shows set values in a case where a two-screen display is being performed as shown in FIG. 5D.

In the case of the display screen information 25 of FIG. 5C, the display mode 37 is "multiple split display" and the number of screens 38 is 2. Further, the number T1 of the input terminal and the signal type information HDMI-01 are stored in association with each other as the layout information 39 for the left display screen G1, and the number T2 of the input terminal and signal type information DSUB-01 are stored in association with each other as the layout information 39 for the right display screen G2.

In a case where the number of display screens, the layout of screens, or the like has been changed, the display screen information 25 is updated in accordance with the changed screen display state.

The input detection information 26 is information related to a touch operation as detected from the touch information 24 and the split screen information 22 and, for example, as shown in FIGS. 6A to 6G, is information including a starting point position 40, an ending point position 41, the number of taps 42, a movement distance 43, a direction of movement 44, and a screen position determination 45.

The starting point position 40 indicates the number of a display screen on which a touch start position (stating point) is present. For example, in a case where the coordinate value of a touch start position (starting point) stored as the touch information 24 is present within a region on the currently displayed screen G1, the starting point position 40 is set to G1.

The ending point position 41 indicates the number of a display screen on which a touch release position (ending point) is present. For example, in a case where the coordinate value of a touch release position (ending point) stored as the touch information 24 is present within a region on the currently displayed screen G4, the ending point position G4 is set to G4.

The number of taps 42 means the number of touch points at which the touch panels has been touched simultaneously. For example, in a case where two touch start positions (starting points) have been detected by the touch detection section 2, the number of taps 42 is set at 2. In a case where one touch start position (starting point) has been detected, the number of taps 42 is set at 1.

The movement distance 43 means the distance between a touch start position (starting point) and a touch release position (ending point) stored as the touch information 24. A direct distance between a touch start position (starting point) and a touch release position (ending point) is calculated and set as the movement distance 43. In a case where the movement distance 43 between a touch start position (starting point) and a touch release position (ending point) is zero, the absence of a movement is detected, as the position where the touch was started and the position where the touch was released are the same.

The direction of movement 44 means the direction of a straight line extending from a touch start position (starting point) to a touch release position. (ending point), and sets the orientation of this straight line, the angle of this straight line with respect to the X axis, or the like. For example, in a case where the direction of a straight; line extending from a touch start position (starting point) to a touch release position (ending point) is a direction toward the upper right of the display panel or a direction of 60 degrees with respect to a positive direction of the X axis, information meaning "upper right" is configured as the direction of movement 44.

The screen position determination 45 is information indicating whether a touch start position (starting point) and a touch release position. (ending point) belong to the same screen or belong to different screens. That is, the screen position determination 45 is information obtained by determining whether the starting point position 40 and ending point position 41 thus set are identical. For example, in a case where the starting point position 40 and the ending point position 41 are both G1, information meaning "same screen" is configured. Further, in a case where the starting point position 40 is G1 and the ending point position 41 is G2, information meaning "different screens" is configured.

FIGS. 6A to 6G illustrate examples of the input detection information 26.

FIG. 6A shows, but is not limited to, six examples of the input detection information 26.

FIGS. 6B to 6G show six examples of touch operations.

FIG. 6B shows a case where a touch start position (starting point) and a touch release position (ending point) are the same position, and in this case, the input detection information 26 of No. 1 of FIG. 6A is configured and stored in the storage section 20.

FIG. 6C shows a case where a touch start position (starting point) is located on the screen G1, a touch release position (ending point) is located on the screen G4, i.e. where a touch start position (starting point) and a touch release position. (ending point) belong to different screens, and where the direction of movement is lower right. In this case, the input detection information 26 of No. 2 of FIG. 6A is configured and stored in the storage section. 20.

Similarly, in a case where touch operations have been performed as shown in FIGS. 6D to 6G, the input detection information 26 of No. 3 to No. 6 of FIG. 6A is configured, respectively, and stored in the storage section 20.

In FIGS. 6F and 6G, where the number of taps 42 is 2, for example, storage occurs to the effect that two touched positions move in opposite directions and that the two touched positions move in oblique directions or in horizontal directions.

The content of a screen switching process is determined on the basis of the number of taps 42, the movement distance 43, the direction of movement 44, the screen position determination 45, and the like.

The operation judgment, information 21 is information for judging a touch operation that the user has performed and determining a screen switching process corresponding to the touch operation. Although the operation judgment information 21 is information that is stored in advance in the storage section 20, the user may be allowed to uniquely reconfigure the settings for the operation judgment information 21.

The operation judgment information 21 is information mainly associating the current display mode, the user's touch operation, and a screen switching process (execution process) with one another. Further, for judging a touch operation, for example, the number of taps 42, the movement distance 43, the direction of movement 44, and the screen position determination 45 of the input detection information 26 are utilized. If the current display mode and the touch operation have been found, the execution process is determined according to the operation judgment information 21.

FIG. 7 is an explanatory diagram of examples of the operation judgment information 21.

FIG. 7 shows, but is not limited to, thirteen examples of the operation judgment information 21.

In FIG. 7, the current display mode is equivalent to the display mode 37 of the display screen information 25.

Further, the number of taps, the presence or absence of a movement of a touched position, the direction of movement of the touched position, and the screen position determination of a starting point and an ending point of FIG. 7 are equivalent to the number of taps 42, the movement distance 43, the direction of movement 44, and the screen position determination 45 of the input detection information 26, respectively.

The touch operations of FIG. 7 denote the names of operations as determined from the number of taps, the presence or absence of a movement of a touched position, the direction of movement of the touched position, and the screen position determination of a starting point and an ending point. There are four examples of touch operations here, namely a tap, a flick, a swipe, and a double-tap. However, examples of touch operations are not limited to these four examples.

The term "tap" means an operation of starting a touch (touchdown) and releasing the touch (touchup) at the same position on the touch panel.

According to the embodiment of the present disclosure, the term "flick" means an operation of touching (touchdown) one particular point on the touch panel, for example, with a finger, moving the finger while keeping it in touch with the touch panel without bringing out of touch, and then bringing the finger out of touch (touchup) at a position different from the position where the touch was started (touchdown).

According to the embodiment of the present disclosure, the term "swipe" means an operation of touching two points simultaneously and moving the two touched positions in different directions.

The term "double-tap" manes performing a tap operation twice at substantially the same position on the touch panel within a predetermined short period of time. A double-click of mouse operation is equivalent to this double-tap.

First, in a case of the touch judgment information 21 of FIG. 7 where a single-screen display is being performed on the display section 3 and in a case where the input operation judgment section 8 has judged the user's touch operation to be a tap operation in which a touch start position and a touch release position are substantially the same positions or a flick operation in which a touch start position and a touch release position are different positions, the input operation judgment section 8 may decide to perform a screen switching process of switching from the single-screen display to a multiple split display composed of two or more screens.

For example, the touch operation of No. 1 of FIG. 7 is judged to be a tap, because, in a single-screen display state, the number of taps is 1, there is no movement of the touched position, no direction of movement of the touched position is detected, and the starting point and the ending point are identical in screen position to each other.

Further, in a case where a touch operation that the user has performed has been judged to be the tap at No. 1, a process of switching from the single-screen display to a four-screen display is executed.

Further, the touch operation of No. 2 of FIG. 7 is judged to be the flick of No. 2, because, in a single-screen display state, the number of taps is 1, there is a movement of the touched position, a direction of movement of the touched position has been detected, and the starting point and the ending point are identical in screen position to each other.

In a case where a touch operation that the user has performed has been judged to be the flick or No. 2, a process of switching from the single-screen display to a four-screen display and causing the screen that was displayed in single-screen form to be displayed in that one of the four positions of the four-screen display which lies in the detected direction of movement is executed.

Next, in a case of the touch judgment information 21 of FIG. 7 where a single-screen display is being performed on the display section 3 and in a case where the input operation judgment section 8 has judged the user's touch operation to be a swipe operation in which there are two touch start positions and two touch release positions and the touch start positions and the touch release positions are different positions, the input operation judgment section 8 may decide to perform a screen switching process of switching from the single-screen display to a multiple split display composed of two screens.

For example, the touch operation of No. 3 of FIG. 7 is judged to be the swipe of No. 3, because, in a single-screen display state, the number of taps is 2, there are movements of the touched positions, directions of movement of the touched positions are detected as oblique directions, the starting points and the ending points are identical in screen position to each other. In a case where a touch operation that the user has performed has been judged to be the swipe of No. 3, a process of switching from the single-screen display to a two-screen display, particularly a PIP display, is executed.

Further, the touch operation of No. 4 of FIG. 7 is judged to be the swipe of No. 4, because, in a single-screen display state, the number of taps is 2, there are movements of the touched positions, directions of movement of the touched positions are detected as horizontal directions, the starting points and the ending points are identical in screen position to each other. In a case where a touch operation that the user has performed has been judged to be the swipe of No. 4, a process of switching from the single-screen display to a two-screen display, particularly PBP display, is executed.

Next, in a case of the touch judgment information 21 of FIG. 7 where a multiple split display such as four-screen display or a two-screen display is being performed on the display section 3 and in a case where the input operation judgment section 8 has judged the user's touch operation to be a double-tap operation in which a touch start position and a touch release position are substantially the same positions, the input operation judgment section 8 may decide to perform a screen switching process of switching from the multiple split display to a single-screen display.

For example, the touch operation of No. 5 of FIG. 7 is judged to be the double-tap of No. 5, because, in a four-screen display state, the number of taps is 1, there is no movement of the touched position, no direction of movement of the touched position is detected, and the starting point and the ending point are identical in screen position to each other.

In a case where a touch operation that the user has performed has been judged to be the double-tap of No. 5, a process of switching from the four-screen display to a single-screen display and displaying only the screen that was displayed in the position tapped during the four-screen display is executed.

Next, in a case of the touch judgment information 21 of FIG. 7 where a multiple split display is being performed on the display section 3 and in a case where the input operation judgment section 8 has judged the user's touch operation to be a flick operation that entails a movement which causes a touch start position and a touch release position to belong to different display screens, the input operation judgment section 8 may decide to perform a screen switching process of interchanging the display positions of the respective display screens to which the touch start position and the touch release position belong.

For example, the touch operation of No. 6 of FIG. 7 is judged to be the flick of No. 6, because, in a four-screen display state, the number of taps is 1, there is a movement of the touched position, a direction of movement of the touched position has been detected, and the starting point and the ending point are different in screen position from each other.

In a case where a touch operation that the user has performed has been judged to be the flick of No. 6, a process of transposing the two screens of the four-screen display to which the starting and ending points of the touched position is executed.

Further, the touch operation of No. 7 of FIG. 7 is judged to be the flick of No. 7, because, in a four-screen display state, the number of taps is 1, there is a movement of the touched position, a direction of movement of the touched position is detected as an outward direction toward the outside of the screen, and the starting point and the ending point are identical in screen position to each other.

In a case where a touch operation that the user has performed has been judged to be the flick of No. 7, a process of switching from displaying an image in accordance with one input signal to displaying an image in accordance with another input signal in a position on the screen of the four-screen display to which the starting and ending points of the touched position belong is executed.

Description of Examples of Touch Operations and Screen Switching Processes

The following gives a brief description of examples of what screen switching processes are performed in cases where several touch operations of the operation judgment information 21 shown in FIG. 7 have been performed. No. 1 to No. 13 of FIG. 7 correspond to the numbers of the examples. FIGS. 8A to 8C and FIGS. 9A and 9B each illustrate explanatory diagrams of an example of an operation for switching from a single-screen display to a four-screen display.

Example 1

(1) to (4) of FIG. 8A and (1) to (4) of FIG. 9A show operations for switching from a single-screen display to a four-screen display and screen switching according to Example 1, which corresponds to No. 1 of FIG. 7.

(1) of FIG. 8A shows a single-screen display state. Assume here that the image of the screen number G1 is being displayed on the entire display panel. In this state, the display screen information 25 is configured such that the display mode 37 is "single screen", that the number of screens 38 is 1, and that the screen number G1 and the input terminal and signal type information corresponding to the currently displayed image are stored as the layout information 39.

(2) of FIG. 8A shows a state where the user has touched the touch panel and a touch start position (starting point) P1 has been detected.

(3) of FIG. 8A shows a state where the user has released his/her touch on the touch panel at the same position as the starting point and a touch release position (ending point) P2 has been detected.

According to this, the touch information 24 and the input detection information 26 are acquired by the touch detection section 2 and the touched position acquisition section 7, respectively, and stored in the storage section 20.

Since a comparison between the input detection information 26 thus acquired and the operation judgment information 21 shows that the starting point and the ending point are in the same screen position on the single-screen display, the touch operation is judged to be the tap of No. 1 of the operation judgment information 21 of FIG. 7.

Further, since No. 1 of the operation judgment information 21 shows that the execution process corresponding to the touch operation is a process of switching to a four-screen display, a four-screen display is performed as shown in (4) of FIG. 8A.

(4) of FIG. 8A shows a state where the screen G1, which was displayed in single-screen form, is split-displayed in reduced form in the lower left display region and the other screens (G2, G3, G4) are displayed in the other three display regions.

Examples of images that are displayed on the other screens may include images based on any of the plurality of video signals being inputted to the input terminals. Further, the user may select video signals representing images that are displayed on the other screens.

Further, in a case where a four-screen split display has been performed, the display screen information 25 is updated to the current display screen information. The display mode 37 of the display screen information 25 is updated to "multiple split display", and the number of screens 38 is updated to 4. Furthermore, since the input terminals and the signal type information have been stored in advance in association with each other as the video signal information 23, the number of the four screens of the four-screen display, the input terminals, and the signal type information are stored in association with one another as the layout information 39 of the display screen information 25.

In a case where the tap operation shown in (2) and (3) of FIG. 8A has been performed, the touch operation is automatically judged to correspond to No. 1 of the operation judgment information 21 of FIG. 7, which has been preconfigured. This allows the user to easily and quickly switch to the intended screen display simply by performing a tap operation, thus making it possible to lessen the burden of operation on the user.

Next, as with (1) of FIG. 8A, (1) of FIG. 9A shows a single-screen display state, and as with (2) of FIG. 8A, (2) of FIG. 9A shows a state where the user has touched the touch panel and a touch start position (starting point) P1 has been detected. Assume here that the touch start position (starting point) P1 would reside in the display region of the lower right split screen if a four-screen display were being performed.

(3) of FIG. 9A shows a state where the user has released his/her touch on the touch panel at the same position as the starting point and a touch release position (ending point) P2 has been detected.

According to this, the touch information 24 and the input detection information 26 are acquired by the touch detection section 2 and the touched position acquisition section 7, respectively, and stored in the storage section 20.

Since a comparison between the input detection information 26 thus acquired and the operation judgment information 21 shows that the starting and the ending point are in the same screen position on the single-screen display, the touch operation is judged to be the tap of No. 1 of the operation judgment information 21 of FIG. 7.

Further, since the touch operation is a tap operation, the touch release position (ending point) P2, as with the touch start position (starting point) P1, resides in the display region of the lower right split screen.

Therefore, since No. 1 of the operation judgment information 21 shows that the process corresponding to the touch operation is a process of switching to a four-screen display, a four-screen display is performed as shown in (4) of FIG. 9A.

However, in (4) of FIG. 9A, the screen G1, which was displayed in single-screen form, is split-displayed in the display region of the lower right split screen, as the positions of the starting and ending points at which the user tapped would reside in the display region of the lower right split screen if a four-screen display were being performed. (4) of FIG. 9A shows a state where the other screens (G2, G3, G4) are displayed in the other three display regions.

In this case, the position on which the user has tapped is set as the position of split display of the screen G1, which was displayed in single-screen form.

That is, in switching from a single-screen display to a four-screen display, the user can also easily set the position of split display of the screen G1, which was displayed in single-screen form, by performing a tap operation on a position in a display region where the user would like to display the screen G1, which was displayed in single-screen form.

Example 2

(1) to (4) of FIG. 8B, (1) to (4) of FIG. 8C, and (1) to (4) of FIG. 9B show operations for switching from a single-screen display to a four-screen display and screen switching according to Example 2, which corresponds to No. 2 of FIG. 7.

As with (1) of FIG. 8A, (1) of FIG. 8B shows a single-screen display state, and as with (2) of FIG. 8A, (2) of FIG. 8B shows a state where the user has touched the touch panel and a touch start position (starting point) P1 has been detected.

(3) of FIG. 8B shows a state where the user has released his/her touch on the touch panel at a position different from the starting point and a touch release position (ending point) P2 has been detected. A case is shown here where the user has performed a flick operation in a lower right direction. In this case, the input detection information 26 is acquired to the effect that the touch was started and released in the same screen position, that the number of taps is 1, that there is a movement, and that the direction of movement is a lower right direction. Therefore, as the result of a comparison between the input detection information 26 thus acquired and the operation judgment information 21, the touch operation is judged to be the flick of No. 2 of the operation judgment information 21 of FIG. 7.

Further, since it is judged from No. 2 of the operation judgment information 21 that the process corresponding to the touch operation is a process of switching to a four-screen display, a four-screen display is performed as shown in (4) of FIG. 8B. Furthermore, since the direction of movement of the touched position is a lower right direction, the screen G1, which was displayed in single-screen form, is split-displayed in reduced form in the lower right position, which lies in the detected direction of movement. Further, (4) of FIG. 8B shows a state where the other screens (G2, G3, G4) are displayed in the other three display regions.

As with (1) of FIG. 8A, (1) of FIG. 8C shows a single-screen display state, and as with (2) of FIG. 8A, (2) of FIG. 8C shows a state where the user has touched the touch panel and a touch start position (starting point) P1 has been detected.

(3) of FIG. 8C shows a state where the user has released his/her touch on the touch panel at a position different from the starting point and a touch release position (ending point) P2 has been detected. Unlike in (3) of FIG. 8B, a case is shown here where the user has performed a flick operation in a lower left direction.

Assume also that the touch release position (ending point) P2 would reside in the display region of the lower left split screen if a four-screen display were being performed.

In this case, the input detection information 26 is acquired to the effect that the touch was started and released in the same screen position, that the number of taps is 1, that there is a movement, and that the direction of movement is a lower left direction.

Therefore, as the result of a comparison between the input detection information 26 thus acquired and the operation judgment information 21, the touch operation is judged to be the flick of No. 2 of the operation judgment information 21 of FIG. 7. Further, since it is judged from No. 2 of the operation judgment information 21 that the process corresponding to the touch operation is a process of switching to a four-screen display, a four-screen display is performed as shown in (4) of FIG. 8C.

However, unlike in (3) of FIG. 8B, the direction of movement of the touched position is a lower left direction and, if a four-screen display were being performed, the touch release position (ending point) P2 would reside in the display region of the lower left split screen. Therefore, the screen G1, which was displayed in single-screen form, is split-displayed in reduced form in the lower left position, which lies in the detected direction of movement.

The position of split display of the screen G1, which was displayed in single-screen form, may be determined according to the direction of movement of the touched position, but may also be determined with reference to the touch release position (ending point) P2.

Alternatively, the position of split display of the screen G1, which was displayed in single-screen form, may be determined as below with reference to the touch release position (ending point) P2 regardless of the direction of movement of the touched position.

Next, as with (1) of FIG. 8A, (1) of FIG. 9B shows a single-screen display state, and as with (2) of FIG. 8A, (2) of FIG. 9B shows a state where the user has touched the touch panel and a touch start position (starting point) P1 has been detected.

(3) of FIG. 9B shows a state where the user has released his/her touch on the touch panel at a position different from the starting point and a touch release position (ending point) P2 has been detected.

A case is shown here where the user has performed a flick operation in an upper right direction. Assume also that the touch release position (ending point) P2 would reside in the display region of the upper left split screen if a four-screen display were being performed.

In this case, the input detection information 26 is acquired to the effect that the touch was started and released in the same screen position, that the number of taps is 1, that there is a movement, and that the direction of movement is an upper right direction.

Therefore, as the result of a comparison between the input detection information 26 thus acquired and the operation judgment information 21, the touch operation is judged to be the flick of No. 2 of the operation judgment information 21 of FIG. 7.

Further, since it is judged from No. 2 of the operation judgment information 21 that the process corresponding to the touch operation is a process of switching to a four-screen display, a four-screen display is performed as shown in (4) of FIG. 9B.

However, assuming that the position of split display of the screen G1, which was displayed in single-screen form, is determined with reference to not the direction of movement but the touch release position (ending point) P2, the screen G1, which was displayed in single-screen form, is split-displayed in reduced form in the display region of the upper left spit screen.

Example 3

Figure 10A:
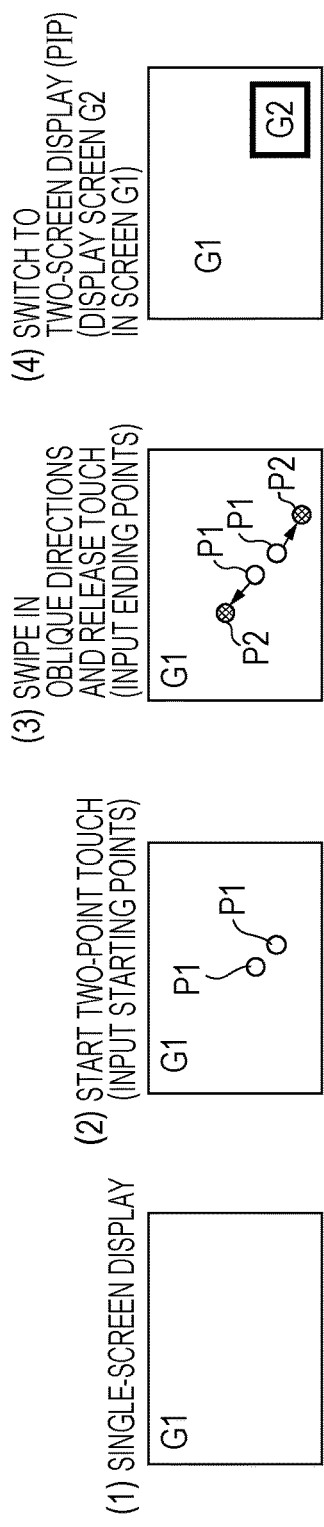
FIG. 10A to 10C each illustrate explanatory diagrams of an example of an operation for switching from a single-screen display to a two-screen display.
Figure 10B:
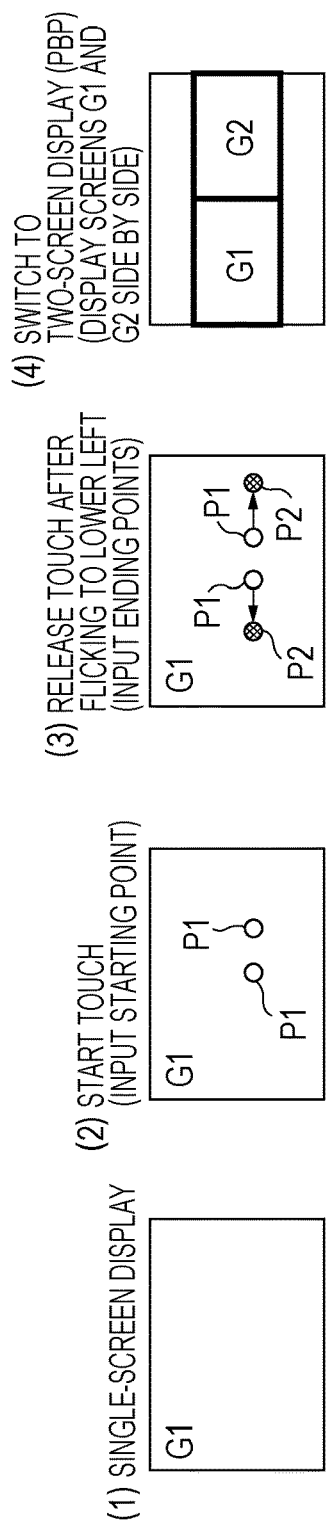
Figure 10C:
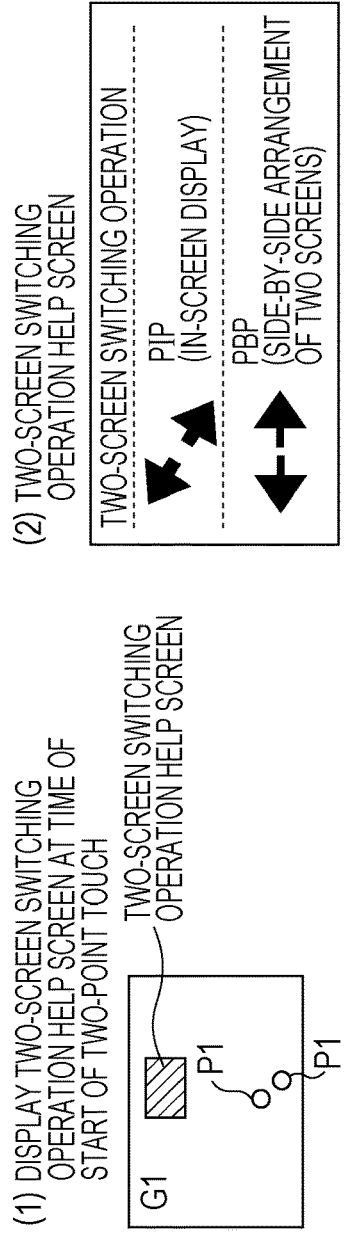

FIG. 10A to 10C each illustrate explanatory diagrams of an example of an operation for switching from a single-screen display to a two-screen display.

(1) to (4) of FIG. 10A show an operation for switching from a single-screen display to a two-screen display (PIP display) and screen switching according to Example 3, which corresponds to No. 3 of FIG. 7.

As with (1) of FIG. 8A, (1) of FIG. 10A shows a single-screen display state. (2) of FIG. 10A shows a state where the user has touched the touch panel, for example, with two fingers and two touch start positions (starting points) P1 have been detected.

(3) of FIG. 10A shows a state where the user has released his/her touch on the touch panel after having performed a swipe operation while keeping the two fingers in touch with the touch panel and two touch release positions (ending points) P2 have been detected. Assume here that the swipe operation is performed in an oblique direction on the display screen. (3) of FIG. 10A shows a case where the swipe operation has been performed in an oblique upper left direction and an oblique lower right direction.

In this case, the input detection information 26 is acquired to the effect that the touch was started and released in the same screen position, that the number of taps is 2, that there is a movement, and that the directions of movement are an oblique upper left direction and an oblique lower right direction. Therefore, as the result of a comparison between the input detection information 26 thus acquired and the operation judgment information 21, the touch operation is judged to be the swipe of No. 3 of the operation judgment information 21 of FIG. 7.

Further, since it is judged from No. 3 of the operation judgment information 21 that the process corresponding to the touch operation is a process of switching to a two-screen display, particularly a PIP display, a PIP display is performed as shown in (4) of FIG. 10A. That is, while the single-screen display G1 is being performed, a display screen G2 having a small display region is simultaneously displayed in the display screen G1.

The position of display of the display screen G2 may be set in advance. For example, the position of display of the display screen G2 may be set in a position near either of the two touch release positions (ending points) P2. Further, the screen that is displayed in the display screen G1 may be any screen that has been automatically selected from among screens corresponding to video signals inputted or may be a desired screen that has been selected by the user.

This allows the user to easily and quickly switch to the intended screen display simply by performing a predetermined swipe operation, thus making it possible to lessen the burden of operation on the user.

Further, as shown in (1) of FIG. 10C, a two-screen switching operation help screen may be displayed in a case where the user has touched the touch panel at two starting points in order to switch from a single-screen display to a two-screen display. It is only necessary that at a point in time where two touch start positions (starting points) P1 have been detected as shown in (2) of FIG. 10A or (2) of FIG. 10B, the two-screen switching operation help screen be displayed in any position that does not hinder the user's touch operation.

Since, as mentioned above, two-screen display comes in either a PIP display or a PBP display, the user needs to understand in advance what swipe operation he/she needs to perform after a two-point touch in order to switch to a PIP display or a PBP display. To facilitate the user's operation of switching to a two-screen display, the display panel displays the two-screen switching operation help screen. (2) of FIG. 10C shows an example of the two-screen switching operation help screen.

In (2) of FIG. 10C, the two oblique or sloping oppositely-oriented arrows mean that an oblique swipe operation is performed on the display screen, and this shows that switching to a PIP display is made in a case where an oblique swipe operation has been performed.

Further, the two horizontal oppositely-oriented arrows mean that a horizontal swipe operation is performed on the display screen, and this shows that switching to a PBP display is made in a case where a horizontal swipe operation has been performed.

Example 4

(1) to (4) of FIG. 10B show an operation for switching from a single-screen display to a two-screen display (PBP display) and screen switching according to Example 4, which corresponds to No. 4 of FIG. 7.

As with (1) of FIG. 8A, (1) of FIG. 10B shows a single-screen display state, and as with (2) of FIG. 10A, (2) of FIG. 10B shows a state where the user has touched the touch panel with two fingers and two touch start positions (starting points) P1 have been detected.

In the case of (2) of FIG. 10B, too, such a two-screen switching operation help screen as that shown in (2) of FIG. 10C may be displayed.

(3) of FIG. 10B, shows a state where the user has released his/her touch on the touch panel after having performed a swipe operation while keeping the two fingers in touch with the touch panel and two touch release positions (ending points) P2 have been detected. Assume here that the swipe operation is performed in substantially horizontal directions on the display screen. (3) of FIG. 10B shows a case where the swipe operation has been performed in right and left horizontal directions.

In this case, the input detection information 26 is acquired to the effect that the touch was started and released in the same screen position, that the number of taps is 2, that there is a movement, and that the directions of movement are horizontal directions. Therefore, as the result of a comparison between the input detection information 26 thus acquired and the operation judgment information 21, the touch operation is judged to be the swipe of No. 4 of the operation judgment information 21 of FIG. 7.

Further, since it is judged from No. 4 of the operation judgment information 21 that the process corresponding to the touch operation is a process of switching to a two-screen display, particularly a PBP display, a PBP display is performed as shown in (4) of FIG. 10B. That is, either of the two screens to be displayed is the screen G1, which was displayed in single-screen form, and the two screens G1 and G2 are simultaneously displayed side by side in a transverse direction.

Further, the other screen that is different from the screen G1, which was displayed in single-screen form, may be any screen that has been automatically selected from among screens corresponding to video signals inputted or may be a desired screen that has been selected by the user.

Example 5

Figure 11A:
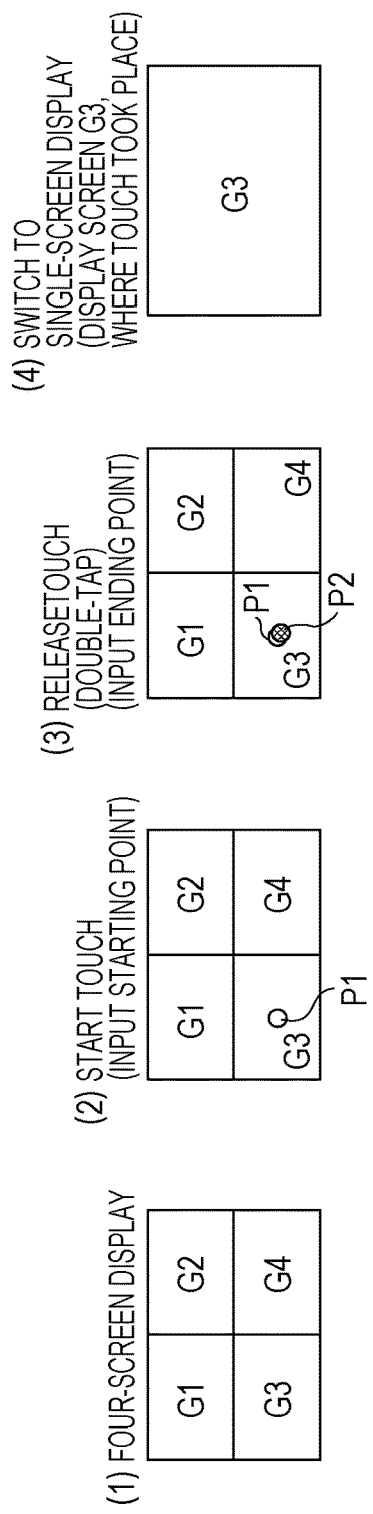
FIGS. 11A to 11C each illustrate explanatory diagrams of an example of an operation for switching from a four-screen display to a single-screen display or an operation of changing the layout of split screens.

(1) to (4) of FIG. 11A illustrate explanatory diagrams of an example of an operation for switching from a four-screen display to a single-screen display.

(1) to (4) of FIG. 11A show an operation for switching from a four-screen display to a single-screen display and screen switching according to Example 5, which corresponds to No. 5 of FIG. 7.

(1) of FIG. 11A shows a four-screen display state in which four screens (G1 to G4) are split-display. (2) of FIG. 11A shows a state where the user has touched the touch panel and a touch start position (starting point) P1 has been detected. A case is shown here where the user has touched a display region on the touch panel that corresponds to the lower left screen G3 of the four screens.

(3) of FIG. 11A shows a state where the user has released his/her touch on the touch panel at the same position as the starting point and a touch release position (ending point) P2 has been detected.

In this case, the touch start position and the touch release position are both on the same screen G3, so that the absence of a movement of the touched position is detected. The input detection information 26 is acquired by the touched position acquisition section 7 and stored in the storage section 20.

As the result of a comparison between the input detection information 26 thus acquired and the operation judgment information 21, the touch operation performed in the four-screen display state is judged to be the double-tap of No. 5 of the operation judgment information 21 of FIG. 7.

Further, since it is judged from No. 5 of the operation judgment information. 21 that the process corresponding to the touch operation is a process of switching from a four-screen display to a single-screen display, a single-screen display is performed as shown in (4) of FIG. 11A. Further, the screen that was displayed in the position on which the double-tap operation has been performed is displayed in single-screen form. Since this double-tap operation has been performed within the screen G3, the screen G3, where the touch took place, is displayed in single-screen form.

This allows the user to easily and quickly switch to the intended screen display simply by performing a predetermined double-tap operation, thus making it possible to lessen the burden of operation on the user.

Example 6

Figure 11B:
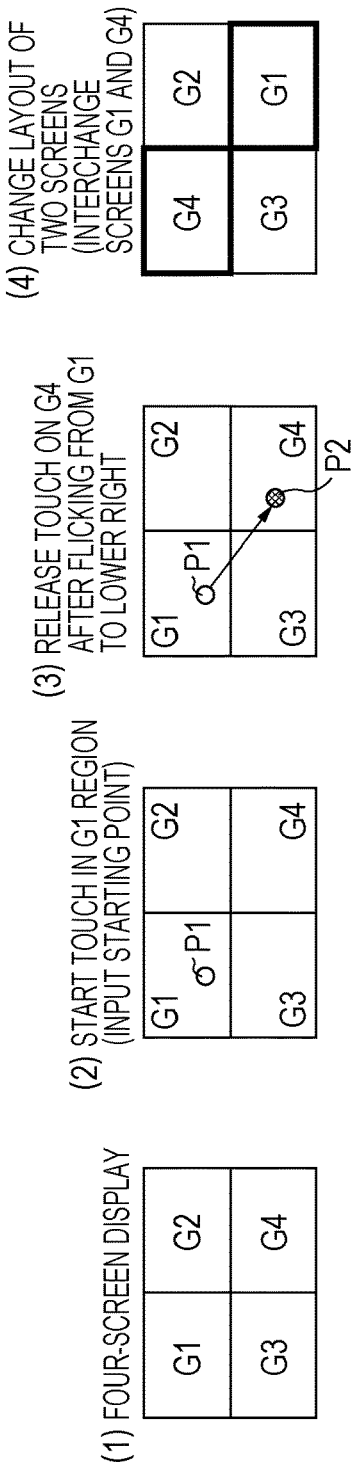
Figure 11C:
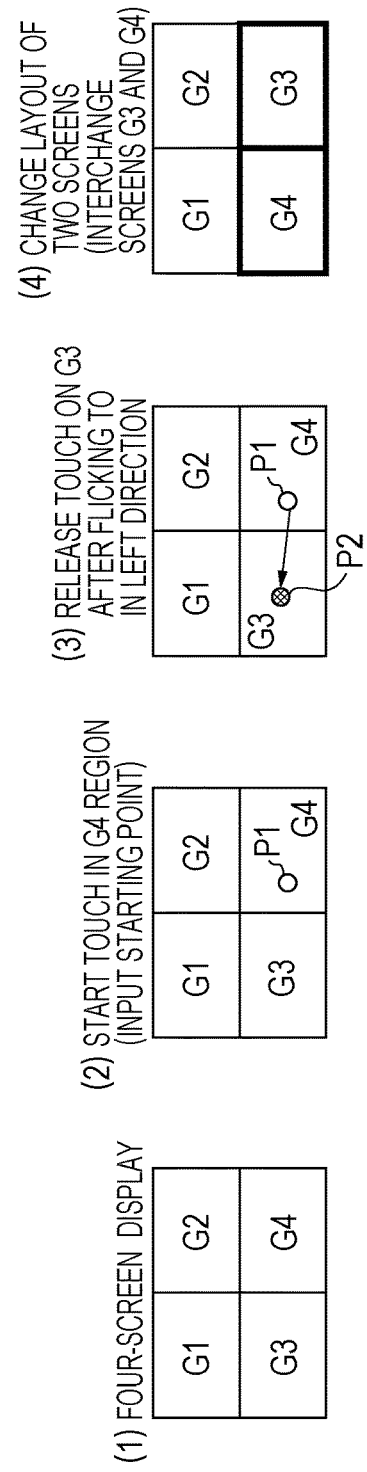

(1) to (4) of FIG. 11B and (1) to (4) of FIG. 11C illustrate explanatory diagrams of examples of an operation for changing the layout of split screens in a four-screen display.

As with (1) of FIG. 11A, (1) of FIG. 11B shows a four-screen display state in which four screens (G1 to G4) are split-displayed.

(2) of FIG. 11B shows a state where the user has touched the touch panel and a touch start position (starting point) P1 has been detected. A case is shown here where the user has touched a display region on the touch panel that corresponds to the upper left screen G1 of the four screens.

(3) of FIG. 11B shows a state where the user has moved the touched position while keeping in touch with the touch panel and released his/her touch on the touch panel on a screen different from the screen G1, where the touch took place, and a touch release position (ending point) P2 has been detected. In (3) of FIG. 11B, the user performs a so-called flick operation in a lower right direction and releases his/her touch on the touch panel within the display region of the lower right screen G4.

In this case, detection occurs to the effect that the touch start position (starting point) and the touch release position (ending point) are on different screens, that the number of taps is 1, that there is a movement of the touched position, and that the direction of movement is a lower right direction, and the input detection information 26 is acquired by the touched position acquisition section 7 and stored in the storage section 20.

As the result of a comparison between the input detection information 26 thus acquired and the operation judgment information 21, the touch operation performed in the four-screen display state is judged to be the flick of No. 6 of the operation judgment information 21 of FIG. 7.

Further, it is judged from No. 6 of the operation judgment information 21 that the process corresponding to the touch operation is an operation of changing the layout of two split screens of a four-screen display, and as shown in (4) of FIG. 11B, the layout of the two split screens located in the positions where the touch was started and released, respectively, is changed. In this example, in which the touch start position (starting point) is on the screen G1 and the touch release position (ending point) is on the screen G4, the display positions of the screens G1 and G4 are interchanged.

Next, (1) to (4) of FIG. 11C, too, show an example of an operation for changing the layout of split screens in a four-screen display.

As with (1) of FIG. 11A, (1) of FIG. 11C shows a four-screen display state in which four screens (G1 to G4) are split-displayed.

(2) of FIG. 11C shows a state where the user has touched the touch panel and a touch start position (starting point) P1 has been detected. A case is shown here where the user has touched a display region on the touch panel that corresponds to the lower right screen G4 of the four screens.

(3) of FIG. 11C shows a state where the user has moved the touched position while keeping in touch with the touch panel and released his/her touch on the touch panel on a screen different from the screen G4, where the touch took place, and a touch release position (ending point) P2 has been detected. In (3) of FIG. 11C, the user performs a flick operation in a lower left direction and releases his/her touch on the touch panel within the display region of the lower left screen G3.

In this case, detection occurs to the effect that the touch start position (starting point) and the touch release position (ending point) are on different screens, that the number of taps is 1, that there is a movement of the touched position, and that the direction of movement is a left direction, and the input detection information 26 is acquired by the touched position acquisition section 7 and stored in the storage section 20.

As the result of a comparison between the input detection information 26 thus acquired and the operation judgment information 21, the touch operation performed in the four-screen display state is judged to be the flick of No. 6 of the operation judgment information 21 of FIG. 7.

Further, it is judged from No. 6 of the operation judgment information 21 that the process corresponding to the touch operation is an operation of changing the layout of two split screens of a four-screen display, and as shown in (4) of FIG. 11C, the layout of the two split screens located in the positions where the touch was started and released, respectively, is changed. In this example, in which the touch start position (starting point) is on the screen G4 and the touch release position (ending point) is on the screen G3, the display positions of the screens G3 and G4 are interchanged.

This allows the user to easily and quickly switch to the intended screen display simply by performing a predetermined flick operation, thus making it possible to lessen the burden of operation on the user.

Example 7

FIGS. 12A and 12B each illustrate explanatory diagrams of an example of an operation for selectively inputting input signals for display on split screens in a four-screen display.

First, as with (1) of FIG. 11A, (1) of FIG. 12A shows a four-screen display state in which four screens (G1 to G4) are split-displayed.

Assume also that an image based on an input signal whose signal type is HDMI-01 is being displayed on the upper left screen G1, that an image based on an input signal whose signal type is DSP-01 is being displayed on the upper right screen G2, that an image based on an input signal whose signal type is DVI-01 is being displayed on the lower left screen G3, and that an image based on an input signal whose signal type is HDMI-02 is being displayed on the lower right screen G4.

(2) of FIG. 12A shows a state where the user has touched the touch panel and a touch start position (starting point) P1 has been detected. A case is shown here where the user has touched a display region on the touch panel that corresponds to the upper right screen G2 of the four screens.

(3) of FIG. 12A shows a state where the user has moved the touched position while keeping in touch with the touch panel and released his/her touch on the touch panel on the same screen G2, where the touch took place, and a touch release position (ending point) P2 has been detected. In (3) of FIG. 12A, within the display region of the screen G2, the user performs a flick operation in an outward direction (upper right direction) toward the outside of the screen and releases his/her touch on the touch panel.

In this case, detection occurs to the effect that the touch start position (starting point) and the touch release position (ending point) are on the same screen, that the number of taps is 1, that there is a movement of the touched position, and that the direction of movement is an outward direction toward the outside of the screen, and the input detection information 26 is acquired by the touched position acquisition section 7 and stored in the storage section 20.

As the result of a comparison between the input detection information 26 thus acquired and the operation judgment information 21, the touch operation performed in the four-screen display state is judged to be the flick of No. 7 of the operation judgment information 21 of FIG. 7.

Further, it is judged from No. 7 of the operation judgment information 21 that the process corresponding to the touch operation is an operation of switching input signals on the screen G2, where the touch took place, of the four-screen display, and first, as shown in (4) of FIG. 11C, a screen of an input signal list menu is displayed.

The input signal list menu shows the signal types of video signals currently inputted to the plurality of input terminals, respectively (4) of FIG. 12A shows the type of six currently inputted video signals. The input signal list menu needs only be displayed in or near the screen G2, where switching from one input signal to another takes place.

Having seen the input signal list menu, the user selectively inputs a desired one of the video signal types on the input signal list menu that the user would like for display on the screen G2. That is, the user touches a region on the touch panel where the desired video signal type is being displayed.

(4) of FIG. 12A shows a state where "HDMI-03" has been touch-inputted. Once the desired video signal type is selected, an image based on an input signal "HDMI-03" of the video signal type thus selected is displayed on the screen G2, where the touch took place, as shown in (5) of FIG. 12A.

As noted above, performing an operation as shown in to (4) of FIG. 12A enables switching from displaying the image "DSB-01" on the screen G2 to displaying the user-selected desired image "HDMI-03" on the screen G2, where the touch took place.

Next, (1) to (3) of FIG. 12B show a case where one display position of an already-displayed input signal is changed.

(1) of FIG. 12B shows a case where the user has touched the display region of the lower right screen G4 and then moved the touched position while keeping in touch with the touch panel, and released the touch on the same screen G4, where the touch took place.

In this case, detection occurs to the effect that the touch start position (starting point) P1 and the touch release position (ending point) P2 are on the same screen G4, that the number of taps is 1, that there is a movement of the touched position, and that the direction of movement is an outward direction (upper right direction) toward the outside of the screen, and the input detection information 26 is acquired by the touched position acquisition section 7 and stored in the storage section 20.

As the result of a comparison between the input detection information 26 thus acquired and the operation judgment information 21, the touch operation performed in the four-screen display state is judged to be the flick of No. 7 of the operation judgment information 21 of FIG. 7.

Therefore, as with (3) of FIG. 12A, it is judged from No. 7 of the operation judgment information 21 that the process corresponding to the touch operation is an operation of switching input signals on the screen G4, where the touch took place, of the four-screen display, and as shown in (2) of FIG. 12B, a screen of an input signal list menu is displayed.

Since the input signal list menu shows the signal types of video signals being inputted to the plurality of input terminals, respectively, the user selectively inputs a region displaying a desired video signal type that the user would like for display on the screen G4.

(2) of FIG. 12B shows a state where the "DVI-01" part of the input signal list menu has been touch-inputted.

Since DVI-01 is the signal type of the image already displayed on the screen G3, the images being displayed on the screens G3 and G4 are interchanged.

That is, as shown in (3) of FIG. 12B, the display positions of "DVI-01", which was displayed on the screen G3, and "HDMI-02", which was displayed on the screen G4, are interchanged so that the image based on "HDMI-02" is displayed on the screen G3 and the image based on "DVI-01" is displayed on the screen G4.

This allows the user to easily and quickly switch to the intended screen display simply by performing a predetermined flick operation and a predetermined signal selection operation, thus making it possible to lessen the burden of operation on the user.

Example 8

(1) to (4) of FIG. 13A illustrate explanatory diagrams of an example of an operation for switching from a two-screen display to a single-screen display.

(1) to (4) of FIG. 13A show an operation for switching from a PIP display, which is a two-screen display, to a single-screen display and screen switching according to Example 8, which corresponds to No. 8 of FIG. 7.

(1) of FIG. 13A shows a two-screen display state in which two screens (G1, G2) are PIP-displayed.

(2) of FIG. 13A shows a state where the user has touched the touch panel and a touch start position (starting point) P1 has been detected. A case is shown here where the user has touched a display region on the touch panel that corresponds to the screen G1.

(3) of FIG. 13A shows a state where the user has double-tapped and released his/her touch on the touch panel at the same position as the starting point and a touch release position (ending point) P2 has been detected.

In this case, the touch start position and the touch release position are both on the same screen G1, so that the absence of a movement of the touched position is detected. The input detection information 26 is acquired by the touched position acquisition section 7 and stored in the storage section 20.

As the result of a comparison between the input detection information 26 thus acquired and the operation judgment information 21, the touch operation performed in the two-screen PIP display state is judged to be the double-tap of No. 8 of the operation judgment information 21 of FIG. 7.

Further, it is judged from No. 8 of the operation judgment information 21 that the process corresponding to the touch operation is a process of switching from a two-screen display to a single-screen display, and as shown in (4) of FIG. 13A, a single-screen display is performed. Further, the screen that was displayed in the position on which the double-tap operation has been performed is displayed in single-screen form. Since this double-tap operation has been performed within the screen G1, the screen G1, where the touch took place, is displayed in single-screen form.

However, if a double-tap operation has been performed within the screen G2, the screen G2 needs only be displayed in single-screen form, as the touch start position and the touch release position are both on the screen G2.

Example 9

(1) to (4) of FIG. 13B illustrate explanatory diagrams of an example of an operation for switching the positions of two screens in a two-screen display.

(1) to (4) of FIG. 13B show an operation for switching between two screens in a PIP display, which is a two-screen display, and screen switching according to Example 9, which corresponds to No. 9 of FIG. 7.

(1) of FIG. 13B shows a two-screen display state in which two screens (G1, G2) are PIP-displayed.

(2) of FIG. 13B shows a state where the user has touched the touch panel and a touch start position (starting point) P1 has been detected. A case is shown here where the user has touched a display region on the touch panel that corresponds to the screen G2.

(3) of FIG. 13B shows a state where the user has performed a flick operation and released his/her touch on the touch panel at the screen G1, on which the starting point is not located, and a touch release position (ending point) P2 has been detected.

In this case, detection occurs to the effect that the touch start position and the touch release position are on different screens, that the number of taps is 1, that there is a movement of the touched position, and that the direction of movement is an upper left direction, and the input detection information 26 is acquired by the touched position acquisition section 7 and stored in the storage section 20.

As the result of a comparison between the input detection information 26 thus acquired and the operation judgment information 21, the touch operation performed in the two-screen PIP display state is judged to be the flick of No. 9 of the operation judgment information 21 of FIG. 7.

Therefore, it is judged from No. 9 of the operation judgment information 21 that the process corresponding to the touch operation is a process of switching between two screens of a two-screen PIP display, and as shown in (4) of FIG. 13B, the display positions of the screens G1 and G2 are interchanged.

Example 10

(1) to (4) of FIG. 13C illustrate explanatory diagrams of an example of an operation for selectively inputting input signals for display on two screens in a two-screen display.

(1) of FIG. 13C shows a two-screen display state in which two screens (G1, G2) are PIP-displayed.

(2) of FIG. 13C shows a case where the user has touched a display region on the touch panel that corresponds to the screen G2, performed a flick operation while keeping in touch, and released the touch within the display region of the screen G2.

In this case, detection occurs to the effect that the touch start position (starting point) P1 and the touch release position (ending point) P2 are on the same screen G2, that the number of taps is 1, that there is a movement of the touched position, and that the direction of movement is an outward direction (upper right direction) toward the outside of the screen, and the input detection information 26 is acquired by the touched position acquisition section 7 and stored in the storage section 20.

As the result of a comparison between the input detection information 26 thus acquired and the operation judgment information 21, the touch operation performed in the two-screen PIP display state is judged to be the flick of No. 10 of the operation judgment information 21 of FIG. 7.

Therefore, it is judged from No. 10 of the operation judgment information 21 that the process correspond in to the touch operation is an operation of switching input signals on the screen G2, where the touch took place, of the two-screen PIP display, and as shown in (3) of FIG. 13C, a screen of an input signal list menu is displayed.

Since the input signal list menu shows the signal types of video signals being inputted to the plurality of input terminals, respectively, the user selectively inputs a region displaying a desired video signal type that the user would like for display on the screen G2.

(3) of FIG. 13C shows a state where the "HDMI-03" part of the input signal list menu has been touch-inputted.

Once the desired video signal type is selected, an image based on an input signal "HDMI-03" of the video signal type thus selected is displayed on the screen G2, where the touch took place, as shown in (4) of FIG. 13C.

As noted above, performing an operation as shown in (2) to (3) of FIG. 13C enables switching from displaying the image "DSB-01" on the screen G2 to displaying the user-selected desired image "HDMI-03" on the screen G2, where the touch took place.

Example 11

Figure 14A:
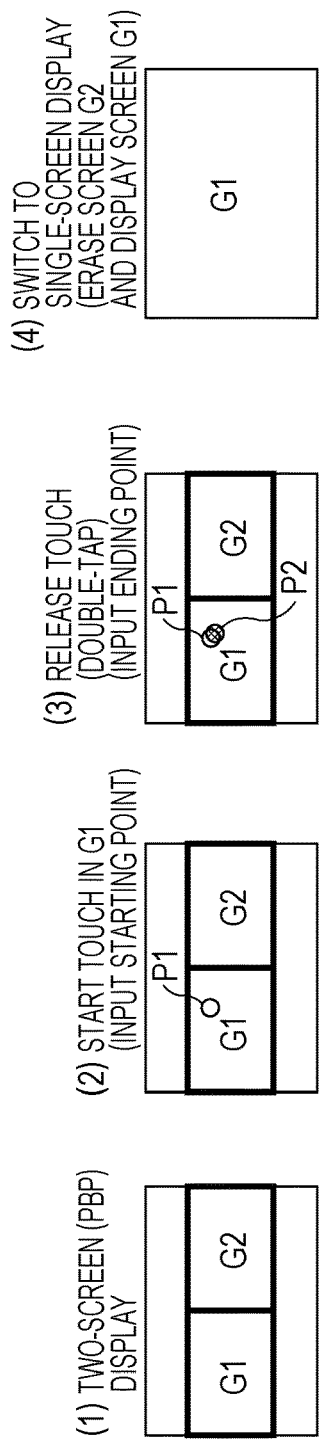
FIGS. 14A to 14C each illustrate explanatory diagrams of an example of an operation for switching from a two-screen display (PBP) to a single-screen display, an operation for changing the layout of two split screens, or a similar operation.

(1) to (4) of FIG. 14A illustrate explanatory diagrams of an example of an operation for switching from a two-screen display to a single-screen display.

(1) to (4) of FIG. 14A show an operation for switching from a PBP display, which is a two-screen display, to a single-screen display and screen switching according to Example 11, which corresponds to No. 11 of FIG. 7.

(1) of FIG. 14A shows a two-screen display state in which two screens (G1, G2) are PBP-displayed.

(2) of FIG. 14A shows a state where the user has touched the touch panel and a touch start position (starting point) P1 has been detected. A case is shown here where the user has touched a display region on the touch panel that corresponds to the screen G1.

(3) of FIG. 14A shows a state where the user has double-tapped and released his/her touch on the touch panel at the same position as the starting point and a touch release position (ending point) P2 has been detected.

In this case, the touch start position and the touch release position are both on the same screen G1, so that the absence of a movement of the touched position is detected. The input detection information 26 is acquired by the touched position acquisition section 7 and stored in the storage section 20.

As the result of a comparison between the input detection information 26 thus acquired and the operation judgment information 21, the touch operation performed in the two-screen PBP display state is judged to be the double-tap of No. 11 of the operation judgment information 21 of FIG. 7.

Therefore, it is judged from No. 11 of the operation judgment information 21 that the process corresponding to the touch operation is a process of switching from a two-screen display to a single-screen display, and as shown in (4) of FIG. 14A, a single-screen display is performed. Further, the screen that was displayed in the position on which the double-tap operation has been performed is displayed in single-screen form. Since this double-tap operation has been performed within the screen G1, the screen G1, where the touch took place, is displayed in single-screen form.

However, if a double-tap operation has been performed within the screen G2, the screen. G2 needs only be displayed in single-screen form, as the touch start position and the touch release position are both on the screen G2.

Example 12

Figure 14B:
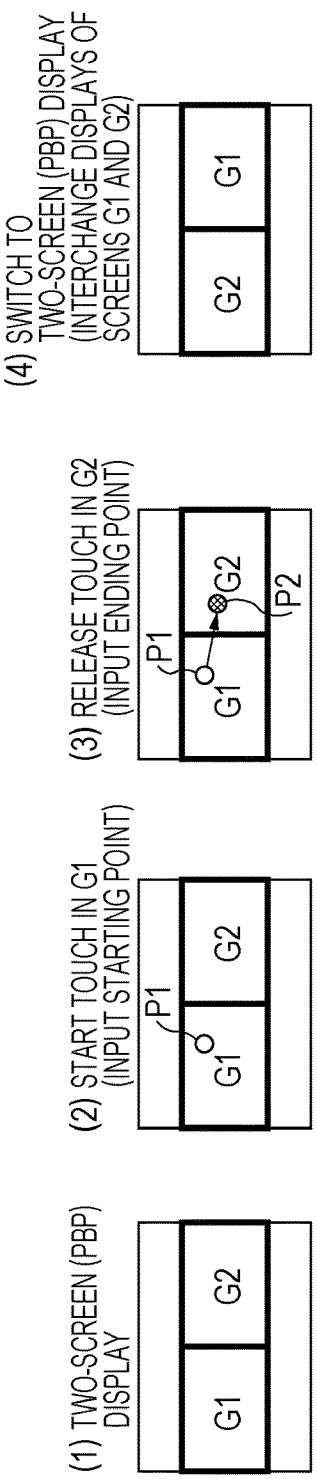

(1) to (4) of FIG. 14B illustrate explanatory diagrams of an example of an operation for switching the positions of two screens in a two-screen display.

(1) to (4) of FIG. 14B show an operation for switching between two screens in a PBP display, which is a two-screen display, and screen switching according to Example 12, which corresponds to No. 12 of FIG. 7.

(1) of FIG. 14B shows a two-screen display state in which two screens (G1, G2) are PBP-displayed.

(2) of FIG. 14B shows a state where the user has touched the touch panel and a touch start position (starting point) P1 has been detected. A case is shown here where the user has touched a display region on the touch panel that corresponds to the screen G1.

(3) of FIG. 14B shows a state where the user has performed a flick operation and released his/her touch on the touch panel at the screen G2, on which the starting point is not located, and a touch release position (ending point) P2 has been detected.

In this case, detection occurs to the effect that the touch start position and the touch release position are on different screens, that the number of taps is 1, that there is a movement of the touched position, and that the direction of movement is a right direction, and the input detection information 26 is acquired by the touched position acquisition section 7 and stored in the storage section 20.

As the result of a comparison between the input detection information 26 thus acquired and the operation judgment information 21, the touch operation performed in the two-screen PBP display state is judged to be the flick of No. 12 of the operation judgment information 21 of FIG. 7.

Therefore, it is judged from No. 12 of the operation judgment information 21 that the process corresponding to the touch operation is a process of switching between two screens of a two-screen PBP display, and as shown in (4) of FIG. 14B, the display positions of the screens G1 and G2 are interchanged.

Example 13

Figure 14C:
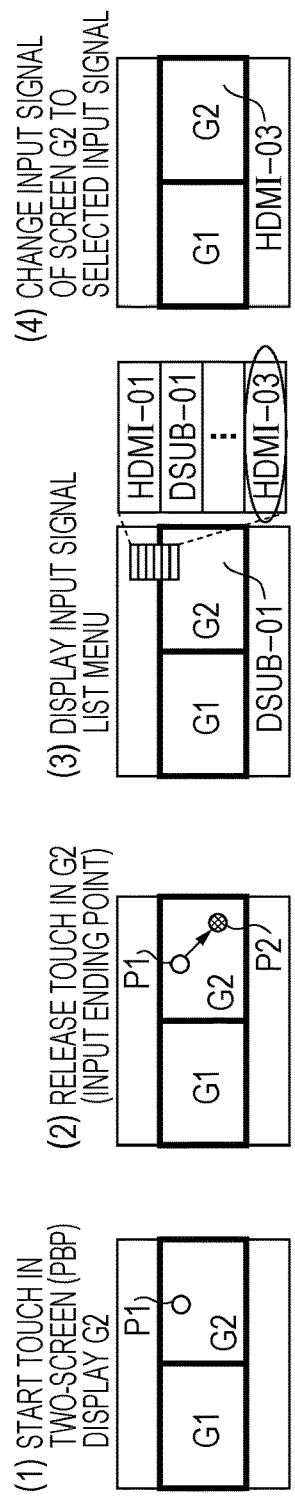

(1) to (4) of FIG. 14C illustrate explanatory diagrams of an example of an operation for selectively inputting input signals for display on two screens in a two-screen display.

(1) of 14C shows a two-screen display state in which two screens (G1, G2) are PBA displayed. Further, (1) of FIG. 14C shows a state where the user has touched the touch panel and a touch start position (starting point) P1 has been detected. A case is shown here where the user has touched a display region on the touch panel that corresponds to the screen G2.

(2) of FIG. 14C shows a case where the user has touched a display region on the touch panel that corresponds to the screen G2, performed a flick operation while keeping in touch, and released the touch within the display region of the screen G2.

In this case, detection occurs to the effect that the touch start position (starting point) P1 and the touch release position (ending point) P2 are on the same screen G2, that the number of taps is 1, that there is a movement of the touched position, and that the direction of movement is an outward direction (upper right direction) toward the outside of the screen, and the input detection information 26 is acquired by the touched position acquisition section 7 and stored in the storage section 20.

As the result of a comparison between the input detection information 26 thus acquired and the operation judgment information 21, the touch operation performed in the two-screen PBP display state is judged to be the flick of No. 13 of the operation judgment information 21 of FIG. 7.

Therefore, it is judged from No. 13 of the operation judgment information 21 that the process corresponding to the touch operation is an operation of switching input signals on the screen G2, where the touch took place, of the two-screen PBP display, and as shown in (3) of FIG. 14C, a screen of an input signal list menu is displayed.

Since the input signal list menu shows the signal types of video signals being inputted to the plurality of input terminals, respectively, the user selectively inputs a region displaying a desired video signal type that the user would like for display on the screen G2.

(3) of FIG. 14C shows a state where the "HDMI-03" part of the input signal list menu has been touch-inputted.

Once the desired video signal type is selected, an image based on an input signal "HDMI-03" of the video signal type thus selected is displayed on the screen G2, where the touch took place, as shown in (4) of FIG. 14C.

As noted above, performing an operation as shown in (2) to (3) of FIG. 14C enables switching from displaying the image "DSB-01" on the screen G2 to displaying the user-selected desired image "HDMI-03" on the screen G2, where the touch took place.

Process of Switching Display Screens

Figure 15:
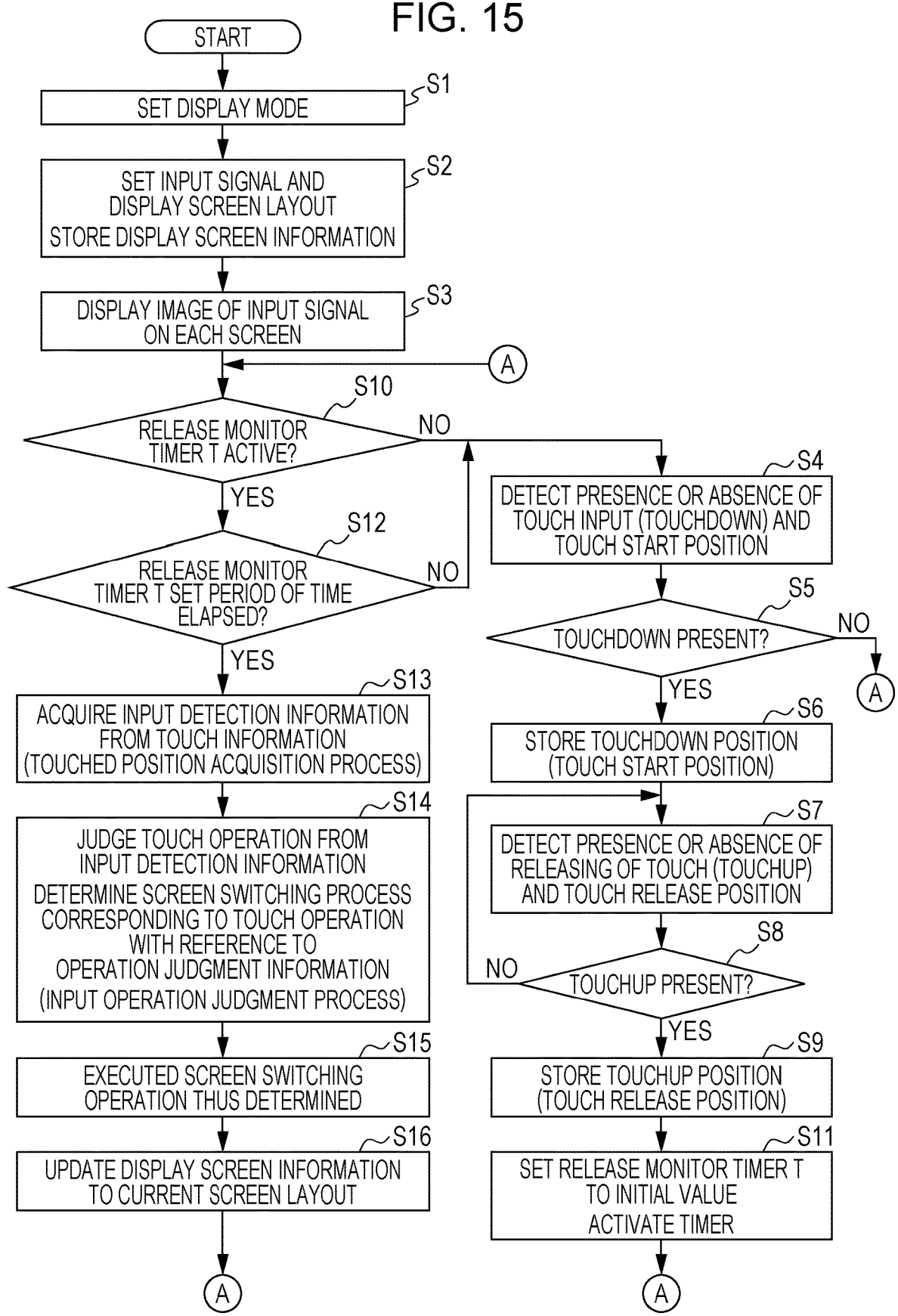
FIG. 15 is a flow chart of an example of a process of switching display screens or a similar process in the image display device according to the embodiment of the present disclosure.

FIG. 15 is a flow chart of an example of a process of switching display screens or a similar process in the image display device according to the embodiment of the present disclosure.

In the following flow chart, switching takes place between a single-screen display in which one screen is displayed on the display panel and a multiple split screen display in which a plurality of screens are displayed on the display panel. Note, however, that although, in general, the number of multiple split screens needs only be 2 or larger, multiple split screens are displayed in either two-screen or four-screen form for ease of explanation.

In step S1 of FIG. 15, the user performs a predetermined input operation and thereby sets a display mode of a screen that is displayed on the display panel.

For example, the user sets whether to perform a single-screen display or a multiple-screen display. Further, in a case of performing a multiple-screen display, the user inputs the number of screens.

In step S2, the user sets a video signal(s) to be inputted and the layout of a display screen(s). In particular, in a case of performing a multiple-screen display, the user performs input that associates display screen numbers with input terminal numbers or with the types (signal type information) of video signals being inputted to input terminals and sets which position on the display panel an image is displayed and from which input terminal the image comes.

Alternatively, in a case of performing a single-screen display, in which one image is displayed in full-screen form on the display panel, the user needs only select one piece of signal type information. This setting causes such display screen information 25 as that shown in FIGS. 5A to 5D to be stored in the storage section 20.

In step S3, the image display device, based on the settings, causes an image represented by a video signal inputted to be displayed in a set position on the display panel.

In step S10, the image display device checks whether a release monitor timer T is active. In a case where the release monitor timer T is currently active, the image display device proceeds to step S12. In a case where the release monitor timer T is not currently active, the image display device proceeds to step S4. The release monitor timer T is a timer for measuring a period of time that has elapsed since a touch was released (touchup).

In step S12, the image display device checks whether the release monitor timer T has timed out and a set period of time has elapsed. In a case where the set period of time has elapsed, the image display device proceeds to step S13. In a case where the set period of time has not elapsed, the image display device proceeds to step S4.

In step S4, the image display device detects the presence or absence of a touch input (touchdown) and a touch start position (starting point) where the touch was started.

In the presence of a touch input (touchdown) in step S5, the image display device proceeds to step S6. In the absence of a touch input (touchdown) in step S5, the image display device returns to step S10.

In step S6, which follows the detection of the touch input (touchdown), the image display device stores a touch start position (starting point) 35 as the touch information 24 in the storage section 20.

In step S7, the image display device detects the presence or absence of releasing (touchup) of the touch input and a touch release position (ending point) where the touch was released.

In the presence of releasing (touchup) of the touch input in step S8, the image display device proceeds to step S9. In the absence of releasing (touchup) of the touch input in step S8, the image display device returns to step S7.

In step S9, which follows the detection of releasing (touchup) of the touch input, the image display device stores a touch release position (ending point) 36 as the touch information 24 in the storage section 20.

In step S11, the image display device sets the release monitor timer T to the initial value and activates the timer T to start counting a predetermined period of time.

The initial value of the release monitor timer T is set, for example, to 0.5 second.

After that, the image display device returns to step S10.

On the other hand, in a case where the set period of time has elapsed, the image display device proceeds to step S13, in which it acquires the input detection information 26 with reference to the touch information 24 and the display screen information 25. This process yields the number of taps, a movement distance, a direction of movement, and a screen position determination such as those described above.

This touched position acquisition process of step S13 will be described in detail later with reference to FIG. 16.

In step S14, the image display device judges the touch operation with reference to the input detection information 26 thus acquired and the operation judgment information 21. Further, the image display device determines, with reference to the operation judgment information 21, a screen switching process corresponding to the touch operation thus judged.

By so doing, the image display device judges whether the touch operation is a tap operation, a flick operation, a swipe operation, or a similar operation and, furthermore, determines whether to perform a process of changing the number of display screens, a process of changing the display positions of split screens, or a similar process.

This input operation judgment process of step S14 will be described in detail later with reference to FIGS. 17 to 20.

In step S15, the image display device executes the screen switching process thus determined.

In this example, the image display device executes a single-screen display process, a four-screen display process, or a similar process determined in FIGS. 17 to 20, which will be described later.

However, as will be mentioned later, in a case where it is not necessary to perform a new screen switching process, such as a case where the screen switching process thus determined is the maintenance of the current screen display, the image display device returns to step S10 without doing anything.

In step S16, the image display device updates the display screen information 25 to the current screen layout information. After that, the image display device returns to step S10.

Touched Position Acquisition Process in Process of Switching Display Screens

Figure 16:
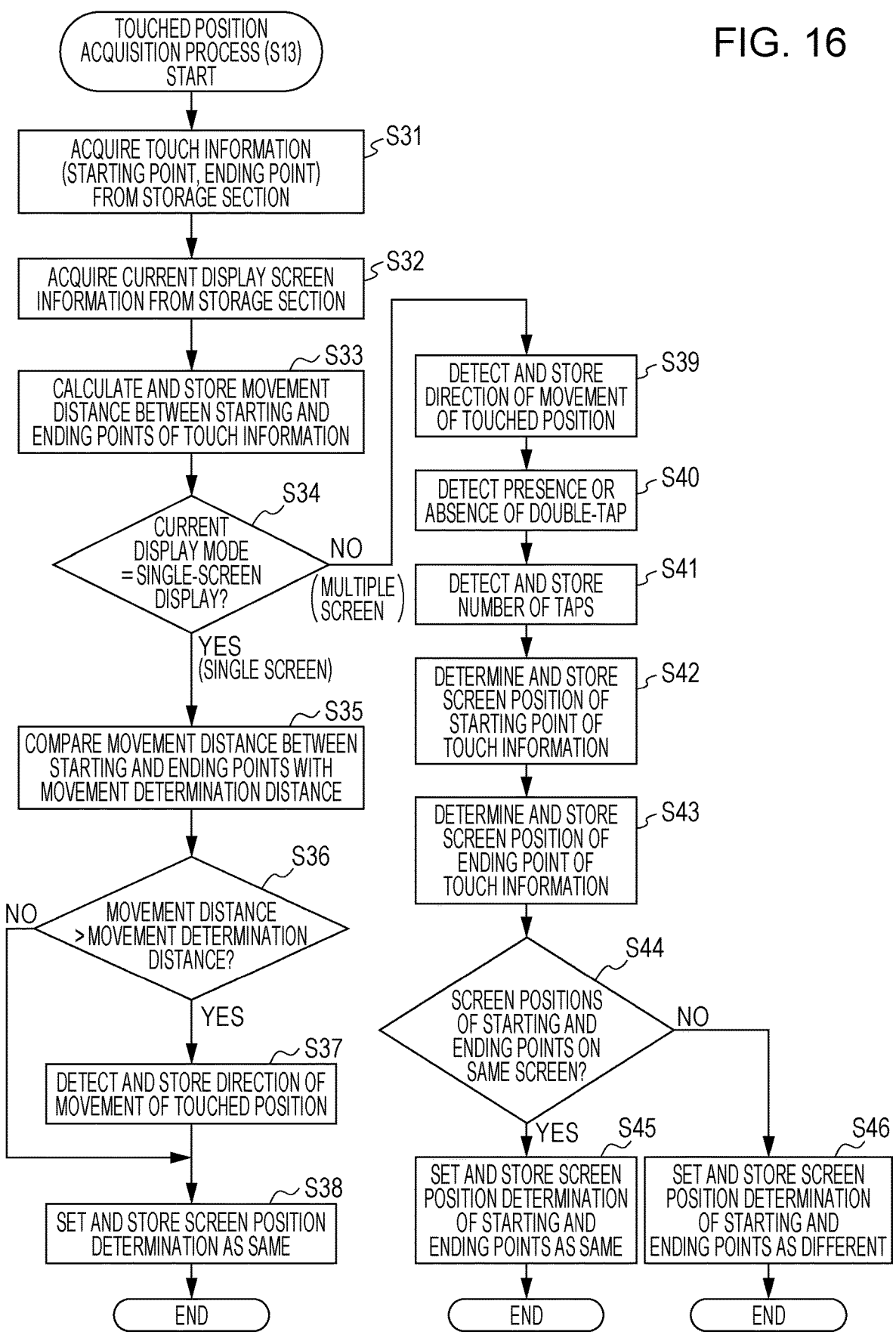
FIG. 16 is a flow chart of an example of a touched position acquisition process according to the embodiment of the present disclosure.

FIG. 16 is a flow chart of an example of the touched position acquisition process shown in step S13 of FIG. 15.

In step S31 of FIG. 16, the image display device reads out the touch information 24 stored in the storage section 20. That is, the image display device reads out the position coordinates of the starting and ending points of the currently acquired touch. In step S32, the image display device reads out the current display screen information 25 stored in the storage section 20. That is, the image display device reads out the display mode of the screen currently displayed on the display panel, the number of display screens, and layout information of the screen.

In step S33, the image display device calculates the movement distance 43, which is the distance between the starting point and the ending point, and stores the movement distance 43 in the storage section 20.

In step S34, the image display device checks whether the current display mode thus read out is a single-screen display. In a case where the current display mode thus read out is a single-screen display, the image display device proceeds to step S35. In a case where the current display mode thus read out is a multiple-screen display, the image display device proceeds to step S39.

In step S35, the image display device makes a comparison between the movement distance between the starting point and the ending point and a movement determination distance stored in advance in the storage section 20.

The movement determination distance is information for determining whether the position where the touch was started (touchdown) and the position where the touch was released (touchup) are substantially the same positions. In a case where the user performs a tap operation by touching the touch panel with a finger or the like, it is desirable that the touchdown and the touchup coincide in position with each other. However, the touchdown and the touchup hardly coincide in position with each other in a tap operation, and when the touchup is made, the touched position may move.

To address this problem, the movement determination distance is configured and stored in advance in the storage section 20 for distinction between a mere tap operation and an operation such as a flick that entails an intended movement of the touched position. The movement determination distance does not need to be fixed at a unique numerical value but needs only be set at any numerical value, e.g. a numerical value of approximately several millimeters.

For example, in a case where the movement distance between the starting point and the ending point is not longer than the movement determination distance, the image display device determines that the position where the touch was started (touchdown) and the position where the touch was released (touchup) are the same and that a tap operation or a double-tap operation has been performed. On the other hand, in a case where the movement distance is longer than the movement determination distance, the image display device determines that the position where the touch was started (touchdown) and the position where the touch was released (touchup) are different and that the user has performed an operation of moving the touched position.

In a case where the movement distance between the starting point and the ending point is longer than the movement determination distance in step S36, the image display device proceeds, to step S37. In a case where the movement distance is not longer than the movement determination distance in step S36, the image display device proceeds to step S38.

In step S37, the image display device detects the direction of movement 44 of the touched position with reference to the coordinates of the starting and ending points and stores the direction of movement 44 in the storage section 20. For example, the image display device detects the direction of a straight line extending from the starting point to the ending point and the angle of this straight line with respect to the X axis, which extends in a horizontal direction of the display panel.

In step S38, since the current display mode is a single-screen display, the image display device sets the screen position determination 45 of the input detection information 26 to "same" and stores the screen position determination 45 in the storage section 20. After that, the image display device ends the process and proceeds to step S14 of FIG. 15.

In step S39, as in step S37, the image display device detects the direction of movement 44 of the touched position with reference to the coordinates of the starting and ending points and stores the direction of movement 44 in the storage section 20.

In step S40, the image display device detects the presence or absence of a double-tap. In this step, for example, the image display device determines whether a touch (touchdown) operation and a touch release (touchup) operation have been repeated twice within a predetermined period of time and, in a case where they have been repeated twice, determines that a double-tap has been performed.

In step S41, the image display device detects the number of taps 42, which indicates the number of positions on the touch panel that have been touched substantially simultaneously, and stores the number of taps 42 in the storage section 20. In a case where the number of positions on the touch panel that have been touched is 1, the number of taps 42 is 1, and in a case where the number of positions on the touch panel that have been touched is 2, the number of taps 42 is 2.

In step S42, the image display device determines the position of the screen to which the starting point of the touch information belongs, and stores the number of the screen thus determined as a starting point position 40. In this step, the image display device makes a comparison between the position coordinates of the starting point and the display regions of split screens of the current display mode stored in the split screen information 22 and determines which split display screen the position coordinates of the starting point belong in the display region of.

In step S43, the image display device determines the position of the screen to which the ending point of the touch information belongs, and stores the number of the screen thus determined as an ending point position 41. In this step, the image display device makes a comparison between the position coordinates of the ending point and the display regions of split screens of the current display mode stored in the split screen information 22 and determines which split display screen the position coordinates of the ending point belong in the display region of.

In step S44, the image display device checks whether the screen position to which the starting point belongs and the screen position to which the ending point belongs, which have been found by the aforementioned determination, are on the same screen. In a case where they are on the same screen, the image display device proceeds to step S45. In a case where they are not on the same screen, the image display device proceeds to step S46.

In step S45, the image display device sets the screen position determination 45, which indicates a positional relationship between the starting point and the ending point, of the input detection information 26 to "same" and stores the screen position determination 45.

In step S46, the image display device sets the screen position determination 45, which indicates a positional relationship between the starting point and the ending point, of the input detection information 26 to "different" and stores the screen position determination 45.

After step S45 or S46, the image display device ends the process and proceeds to step S14 of FIG. 15.

Input Operation judgment Process in Process of Switching Display Screens

FIGS. 17 to 20 illustrate flow charts of an example of the input operation judgment process shown in step S14 of FIG. 15.

Figure 17:
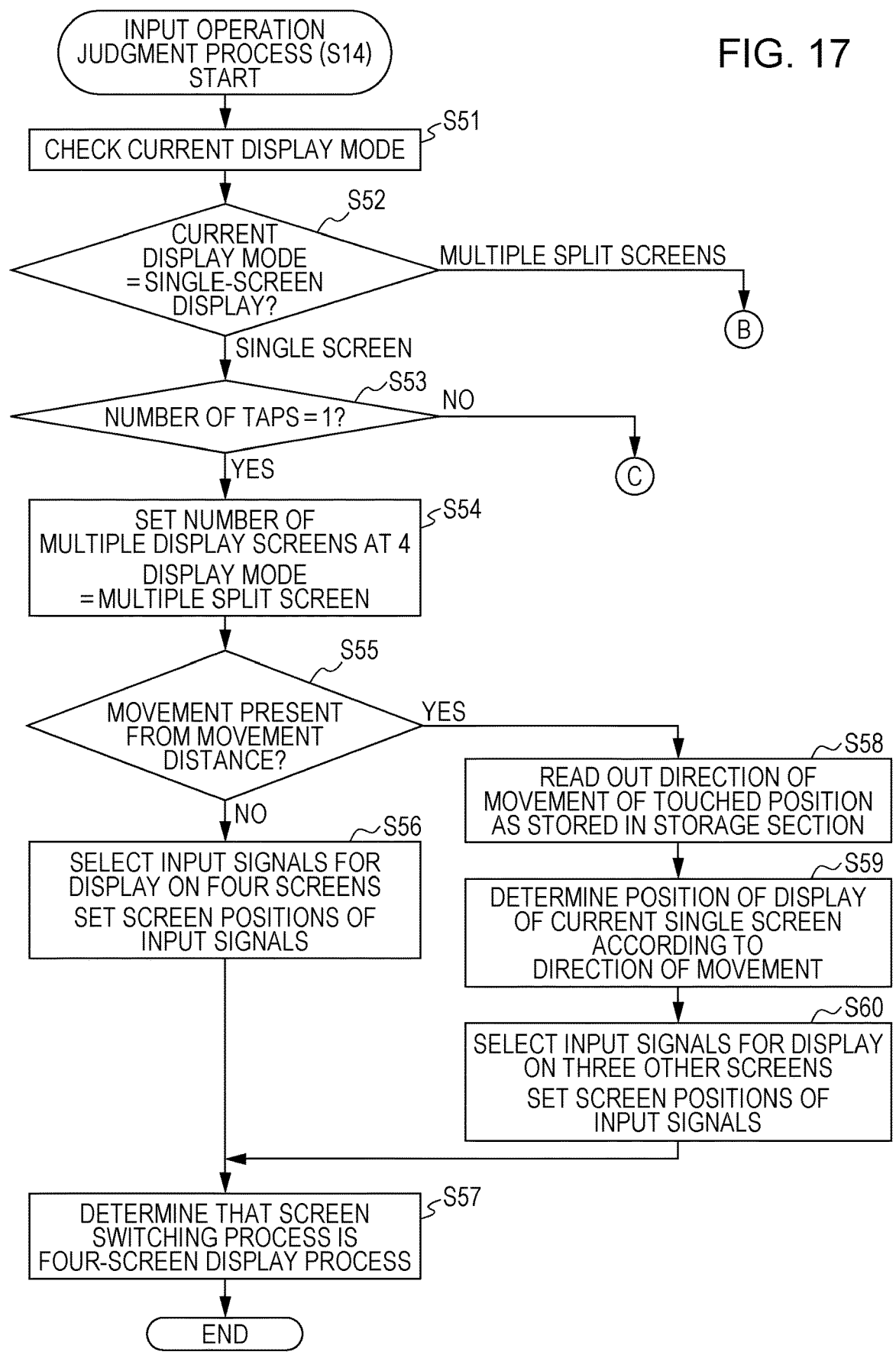
FIG. 17 is a flow chart of an example of an input operation judgment process according to the embodiment of the present disclosure.

In step S51 of FIG. 17, the image display device checks the display mode 37 of the display screen information 25 stored in the storage section 20.

In a case where the current display mode 37 is a single-screen display in step S52, the image display device proceeds to step S53. In a case where the current display mode 37 is a multiple split screen display in step S52, the image display device proceeds to step S71 of FIG. 18. In step S53, the image display device checks whether the number of taps 42 of the input detection information 26 is 1. In a case where the number of taps 42 is 1, the image display device proceeds to step S54. In a case where the number of taps 42 is not 1, the image display device proceeds to step S91 of FIG. 19. This flow chart assumes that in a case where the number of taps 42 is not 1, the number of taps 42 is 2 and the image display device performs a process of switching from a single-screen display to a two-screen display.

The case where the image display device proceeds to step S54 is equivalent to a case where the operation of No. 1 or No. 2 of the operation judgment information 21 of FIG. 7 has been performed. That, the case where the image display device proceeds to step S54 is equivalent to a case where an operation of switching from a single-screen display to a four-screen display has been performed.

In step S54, the image display device sets the number of screens 38 of a multiple display at 4 and sets the current display mode 37 to multiple split screens.

In step S55, the image display device checks the presence or absence of a movement of the touched position with reference to the movement distance 43 stored in the input detection information 26. For example, in a case where the movement distance 43 is longer than such a movement determination distance as that described above, the image display device determines that there was a movement of the touched position and proceeds to step S58. On the other hand, in a case where the movement distance 43 is not longer than the movement determination distance, the image display device determines that there was no movement of the touched position and proceeds to step S56. The case where the image display device proceeds to step S56 corresponds to a case where the operation of No. 1 of the operation judgment information 21 of FIG. 7 has been performed, and the case where the image display device proceeds to step S58 corresponds to a case where the operation of No. 2 of the operation judgment information 21 of FIG. 7 has been performed.

In step S56, the image display device selects input signals for display on the four screens of the four-screen display and sets the screen positions of the input signals thus selected. After that, the image display device proceeds to step S57.

The selection of the input signals is automatically performed in accordance with a preset standard.

For example, in a case where that one of the plurality of input terminals whose image is currently displayed in single-screen form is set in advance on a main channel and the plurality of input terminals include a plurality of input terminals that are set in advance on subchannels, the image display device configures the settings so as to display the image based on the video signal being inputted to the main-channel input terminal and the images based on the video signals being inputted to any three of the subchannel input terminals. The four screens need only be laid out such that each channel is associated in advance with a split display position and an image on each channel is displayed in the corresponding split display position.

Further, in a case where, as shown in FIG. 2C, the screen numbers G1 to G4 are set for the four screens, the image being displayed in single-screen form may be displayed on the upper left screen G1, and on the three other screens (G2 to G4), the images based on the video signals being inputted in ascending order of input terminal number may be displayed in sequence, respectively.

It should be noted that after the four screens have been automatically displayed once, the user may input the settings to select images by him/herself so that desired images are displayed in desired screen positions.

In step S58, the image display device reads out the direction of movement 44 of the touched position as stored in the storage section 20.

In step S59, the image display device determines, on the basis of the direction of movement 44 thus read out, the position in which to display the image currently displayed in single-screen form. For example, in a case where the direction of movement 44 is an upper right direction, the image currently displayed in single-screen form is displayed on the upper-right position screen of the four-screen display. Further, in a case where the direction of movement 44 is a lower left direction, the image currently displayed in single-screen form is displayed on the lower-left position screen of the four-screen display.

In step S60, the image display device selects input signals for display on the three other screens and sets the screen positions of the input signals thus selected. After that, the image display device proceeds to step S57.

The selection of the input signals for the three other screens needs only be automatically performed in accordance with a preset standard similar to the aforementioned standard.

In step S57, the image display device determines that the screen switching process is a multiple-screen display process. In this example, the image display device determines that the screen switching process is a four-screen display process.

After that, the image display device ends step S14 and proceeds to step S15 of FIG. 15.

Figure 18:
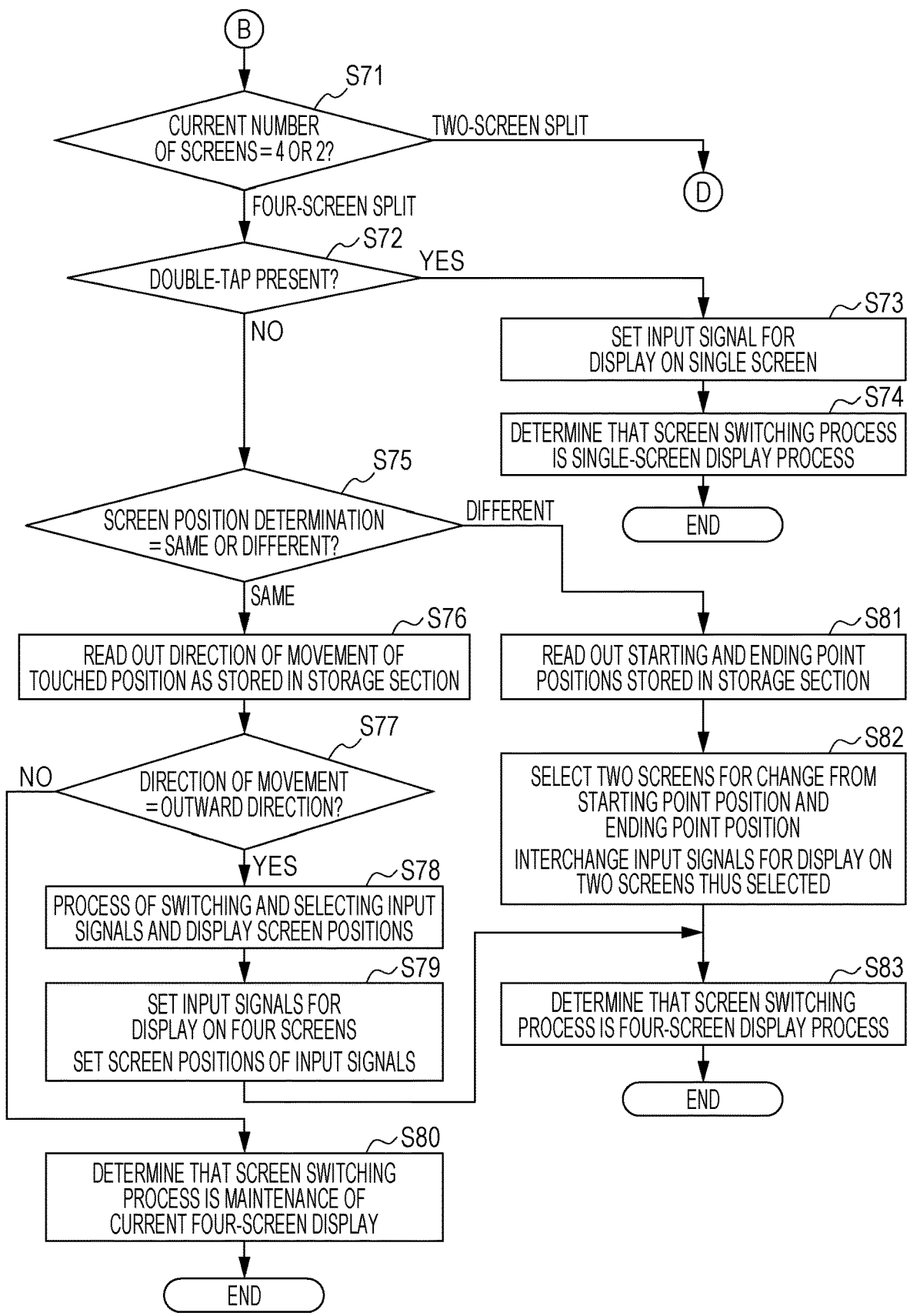
FIG. 18 is a flow chart of the example of the input operation judgment process according to the embodiment of the present disclosure.

In step S71 of FIG. 18, the image display device checks whether the current number of screens 38 is 2 or 4 in the current multiple split screen display.

Figure 20:
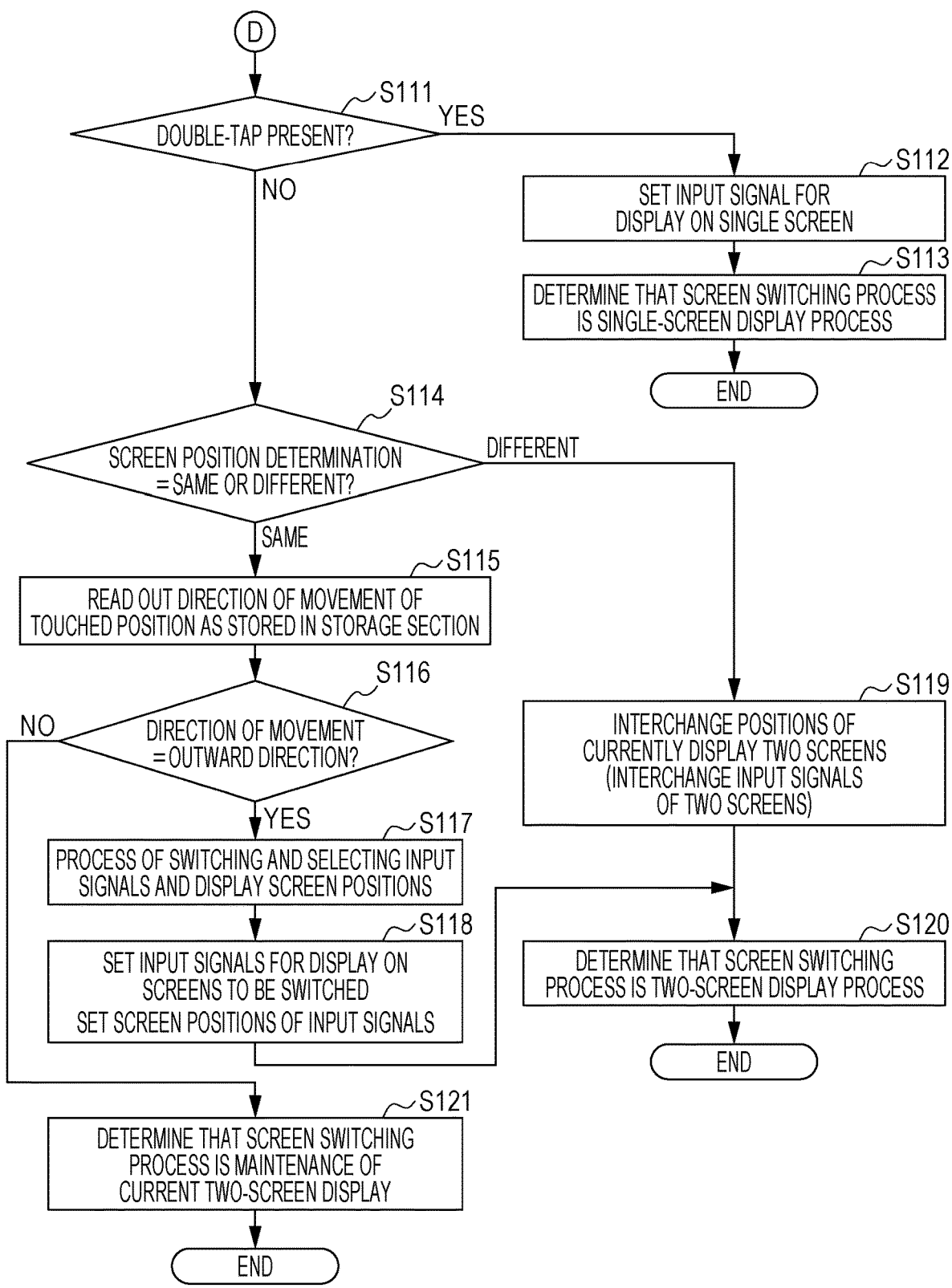
FIG. 20 is a flow chart of the example of the input operation judgment process according to the embodiment of the present disclosure.

In a case where the current number of screens 38 is 2, i.e. a case where a two-screen split display is currently performed, the image display device proceeds to step S111 of FIG. 20. On the other hand, in a case where the current number of screens 38 is 4, i.e. a case where a four-screen split display is currently performed, the image display device proceeds to step S72.

In step S72, the image display device checks whether a double-tap has been performed. In a case where a double-tap has been performed, the image display device proceeds to step S73. In a case where a double-tap has not been performed, the image display device proceeds to step S75. The case where the image display device proceeds to step S73 corresponds to a case where the operation of No. 5 of the operation judgment information 21 of FIG. 7 has been performed.

In step S73, the image display device sets an input signal for display on the single screen from among the images currently displayed on the four screens.

For example, the image display device configures the settings so as to display the image based on the video signal being inputted to that one of the plurality of input terminals which has been set in advance on the main channel.

Further, with reference to the starting and ending point positions 40 and 41 stored, the image on the split screen that was displayed in the double-tapped position has been performed may be selected to be displayed on the single screen as shown in (4) of FIG. 11A.

In step S74, the image display device determines that the screen switching process is a single-screen display process. After that, the image display device ends step S14 and proceeds to step S15 of FIG. 15.

In step S75, the image display device checks whether the screen position determination 45 stored in the storage section 20 is "same" or "different".

In a case where the screen positron determination 45 is "same", the image display device proceeds to step S76. In a case where the screen position determination 45 is "different", the image display device proceeds to step S81. The case where the image display device proceeds to step S81 corresponds to a case where the operation of No. 6 of the operation judgment information of FIG. 7 has been performed.

In step S76, the image display device reads out the direction of movement 44 of the touched position as stored in the storage section 20.

In step S77, the image display device checks whether the direction of movement 44 thus read out is an "outward" direction". In a case where the direction of movement 44 thus read out is an "outward" direction", the image display device proceeds to step S78. In a case where the direction of movement 44 thus read out is not an "outward" direction", the image display device proceeds to step S80.

The case where the image display device proceeds to step S78 corresponds to a case where the operation of No. 7 of the operation judgment information 21 of FIG. 7 has been performed.

In step S78, the image display device performs a process of switching input signals and display screen positions. In this step, the image display device changes, in accordance with the user's selective input operation, from displaying an image based on one input signal to displaying an image based on another input signal on the screen touched.

This switching process is equivalent to such a process as that shown in FIGS. 12A and 12B. The process of switching input signals and display screen positions will be described in detail later with reference to FIG. 21.

In step S79, based on the result of the process of switching input signals and display screen positions, the image display device sets input signals for display on the four screens and sets the screen positions of the input signals thus set. After that, the image display device proceeds to step S83.

In step S83, the image display device determines that the screen switching process is four-screen display process. After that, the image display device ends step S14 and proceeds to step S15 of FIG. 15.

On the other hand, in a case where the image display device has proceeded to step S80, the image display device determines that an invalid operation has been performed, as the direction of movement 44 is not an "outward direction", and determines that the screen switching process is the maintenance of the current four-screen display. In this case, the image display device performs no screen switching process. After that, the image display device ends step S14 and proceeds to step S15 of FIG. 15.

In step S81, the image display device reads out the starting and ending point positions 40 and 41 stored in the storage section 20.

In step S82, the image display device selects, with reference to the starting and ending point positions 40 and 41 thus read out, two screens whose positions are to be changed. Further, the image display device interchanges input signals for display on the two screens thus selected.

In this step, the image display device configures the settings for interchanging the screen stored in the starting point position 40 and the screen stored in the ending point position 41. That is, the image display device configures the settings so that the image based on the input signal that was displayed on the screen to which the touch start position belongs is displayed in the display position of the screen to which the touch release position belongs and the image based on the input signal that was displayed on the screen to which the touch release position belongs is displayed in the display position of the screen to which the touch start position belongs.

After that, the image display device proceeds to step S83 and determines that the screen switching process is a four-screen display process.

Figure 19:
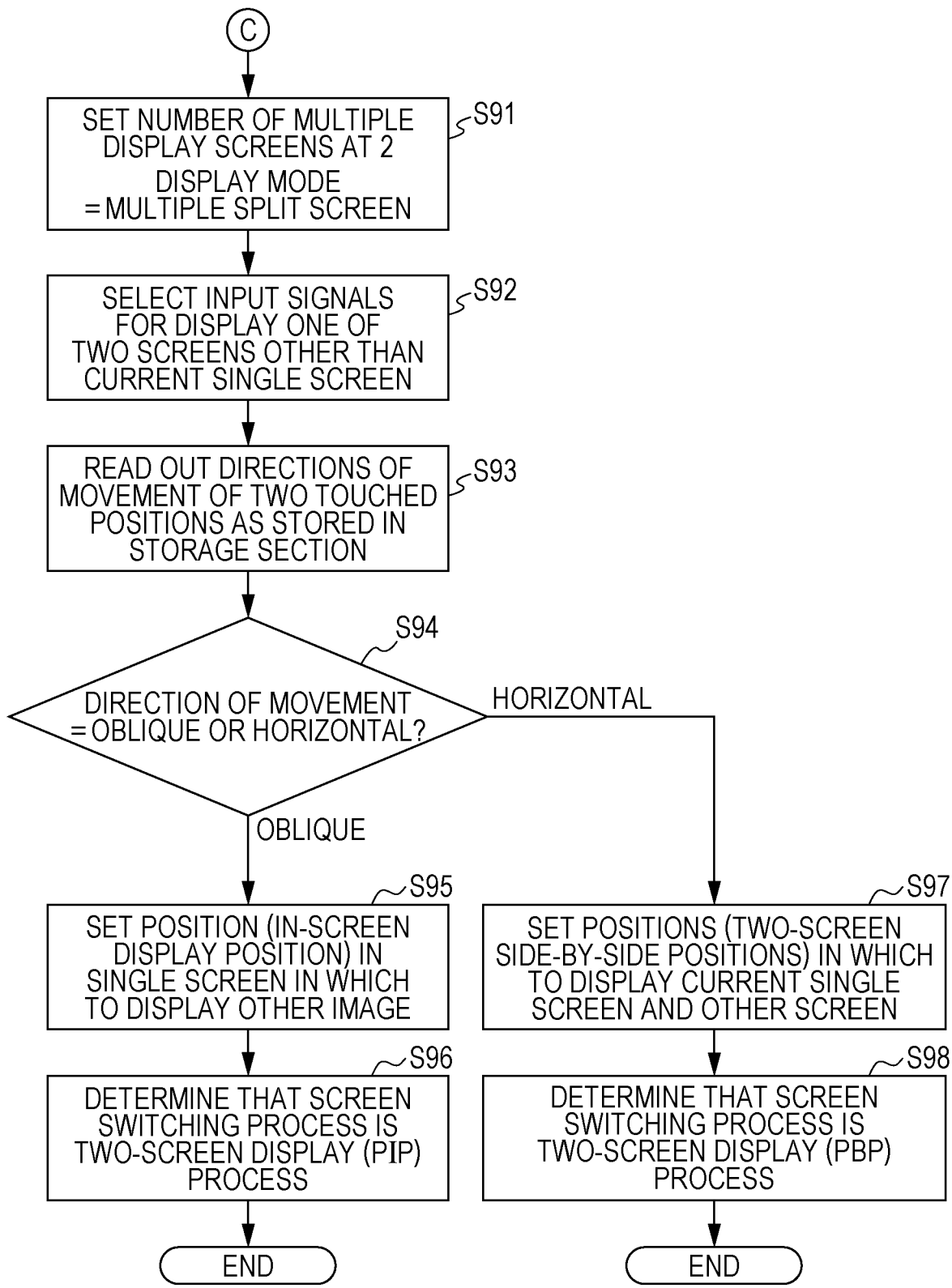
FIG. 19 is a flow chart of the example of the input operation judgment process according to the embodiment of the present disclosure.

In step S91 of FIG. 19, which follows an operation of switching from a single-screen display to a two-screen display, the image display device sets the number of screens 38 of a multiple display at 2 and sets the current display mode 37 to multiple split screens.

In step S92, the image display device selects input signals for display on the two screens.

The image display device needs only configure the settings so that the image based on the input signal currently displayed on the single screen is displayed on a first one of the two screens and an image based on a selected input signal is displayed on a second one of the two screens in accordance with a preset standard.

For the first screen, the input signal representing the image currently displayed on the single screen is directly utilized, and for the second screen, an input signal representing an image other than the image currently displayed on the single screen is selected.

For example, in a case where the plurality of input terminals include a plurality of input terminals that are set in advance on subchannels, the image display device configures the settings so as to display an image based on a video signal being inputted to any one of the subchannel input terminals.

In step S93, the image display device reads out the direction of movement 44 of each of the two touched positions as stored in the storage section 20.

In step S94, the image display device checks whether the direction of movement 44 thus read out is an "oblique direction" or a "horizontal direction". In a case where the direction of movement 44 thus read out is an "oblique direction", the image display device proceeds to step S95. In a case where the direction of movement 44 thus read out is a "horizontal direction", the image display device proceeds to step S97.

The case where the image display device proceeds to step S95 corresponds to a case where the operation of No. 3 of the operation judgment information 21 of FIG. 7 has been performed, and the case where the image display device proceeds to step S97 corresponds to a case where the operation of No. 4 of the operation judgment information 21 of FIG. 7 has been performed.

In step S95, in order to perform a PIP display, the image display device sets, in an inner part of the display region of the single screen, a position (in-screen display position) in which to display the other image.

In the case of a PIP display, the input signal representing the image that was displayed in single-screen form is directly utilized to be displayed in full-screen form on the display panel.

Further, the initial position of a screen that is displayed in the inner part of the display region of the single screen in a PIP display may be stored in advance in the storage section 20 so that the position (in-screen display position) in which to display the other image may be set to this initial position.

As the display position of a screen that is displayed in the inner part of the display region of the single screen, a region of a predetermined size including the position of either of the two starting points may be set. Alternatively, a region of a predetermined size including the position of either of the two ending points may be set as the display position of a screen that is displayed in the inner part of the display region of the single screen.

Furthermore, the size in which to display the other image may be stored in advance in the storage section 20 so that the other image may be displayed in the size.

In step S96, the image display device determines that the screen switching process is a two-screen display (PIP display) process. After that, the image display device ends step S14 and proceeds to step S15 of FIG. 15.

In step S97, in order to perform a PBP display, the image display device sets positions (two-screen side-by-side positions) in which to display the current signal screen and the other screen. In the case of a PBP display, the two screens are arranged side by side in a direction from side to side of the display panel as shown, for example, in FIG. 2B. Accordingly, for example, the settings may be configured in advance so that the current single screen is placed on the left side of the display panel and the other screen is placed on the right side of the display panel.

Alternatively, the settings may be configured so that the image that was displayed on the current single screen is displayed on the side of a display region in which either one starting or ending point of the two starting and two ending points is present and the other screen is displayed on the side of the opposite display region.

In step S98, the image display device determines that the screen switching process is a two-screen display (PBP display) process. After that, the image display device ends step S14 and proceeds to step S15 of FIG. 15.

In step S111 of FIG. 20, the image display device checks whether a double-tap has been performed in a state where a two-screen split display is currently performed.

In a case where a double-tap has been performed, the image display device proceeds to step S112. In a case where a double-tap has not been performed, the image display device proceeds to step S114. The case where the image display device proceeds to step S112 corresponds to a case where the operation of No. 8 or No. 11 of the operation judgment information 21 of FIG. 7 has been performed.

In step S112, as in step S73, the image display device sets an input signal for display on the single screen from among the images currently displayed on the two screens.

For example, the image display device configures the settings so as to display the image based on the video signal being inputted to that one of the plurality of input terminals which has been set in advance on the main channel.

Further, with reference to the starting and ending point positions 40 and 41 stored, the image on the split screen that was displayed in the double-tapped position may be selected to be displayed on the single screen as shown in (4) of FIG. 13A.

In step S113, as in step S74, the image display device determines that the screen switching process is a single-screen display process. After that, the image display device ends step S14 and proceeds to step S15 of FIG. 15.

From step S114 to step S118, the image display device performs substantially the same process as that shown in steps S75 to S79.

In step S114, the image display device checks whether the screen position determination 45 stored in the storage section 20 is "same" or "different".

In a case where the screen position determination 45 is "same", the image display device proceeds to step S115. In a case where the screen position determination 45 is "different", the image display device proceeds to step S119. The case where the image display device proceeds to step S119 corresponds to a case where the operation of No. 9 or No. 12 of the operation judgment information 21 of FIG. 7 has been performed.

In step S115, the image display device reads out the direction of movement 44 of the touched position as stored in the storage section 20.

In step S116, the image display device checks whether the direction of movement 44 thus read out is an "outward" direction". In a case where the direction of movement 44 thus read out is an "outward" direction", the image display device proceeds to step S117. In a case where the direction of movement 44 thus read out is not an "outward" direction", the image display device proceeds to step S121.

The case where the image display device proceeds to step S117 corresponds to a case where the operation of No. 10 or No. 13 of the operation judgment information 21 of FIG. 7 has been performed.

In step S117, the image display device performs a process of switching input signals and display screen positions. In this step, the image display device changes, in accordance with the user's selective input operation, from displaying an image based on one input signal to displaying an image based on another input signal on the screen touched.

This switching process is equivalent to such a process as that shown in (1) to (4) of FIG. 13C or (1) to (4) of FIG. 14C. The process of switching input signals and display screen positions will be described in detail later with reference to FIG. 21.

In step S118, based on the result of the process of switching input signals and display screen positions, the image display device sets input signals for display on the two screens and sets the screen positions of the input signals thus set. After that, the image display device proceeds to step S120.

In step S120, the image display device determines that the screen switching process is a two-screen display process. After that, the image display device ends step S14 and proceeds to step S15 of FIG. 15.

On the other hand, in a case where the image display device has proceeded to step S121, the image display device determines that an invalid operation has been performed, as the direction of movement 44 is not an "outward direction", and determines that the screen switching process is the maintenance of the current two-screen display. In this case, the image display device performs no screen switching process. After that, the image display device ends step S14 and proceeds to step S15 of FIG. 15.

In step S119, the image display device changes the positions of the two currently display screens. That is, the image display device interchanges the input signals for display on the two screens.

After that, the image display device proceeds to the aforementioned step S120 and determines that the screen switching process is a two-screen display process. After that, the image display device ends step S14 and proceeds to step S15 of FIG. 15.

The foregoing has described the flow chart of the input operation judgment process shown in step S14.

Process of Switching and Selecting Input Signals and Display Screen Positions

Figure 21:
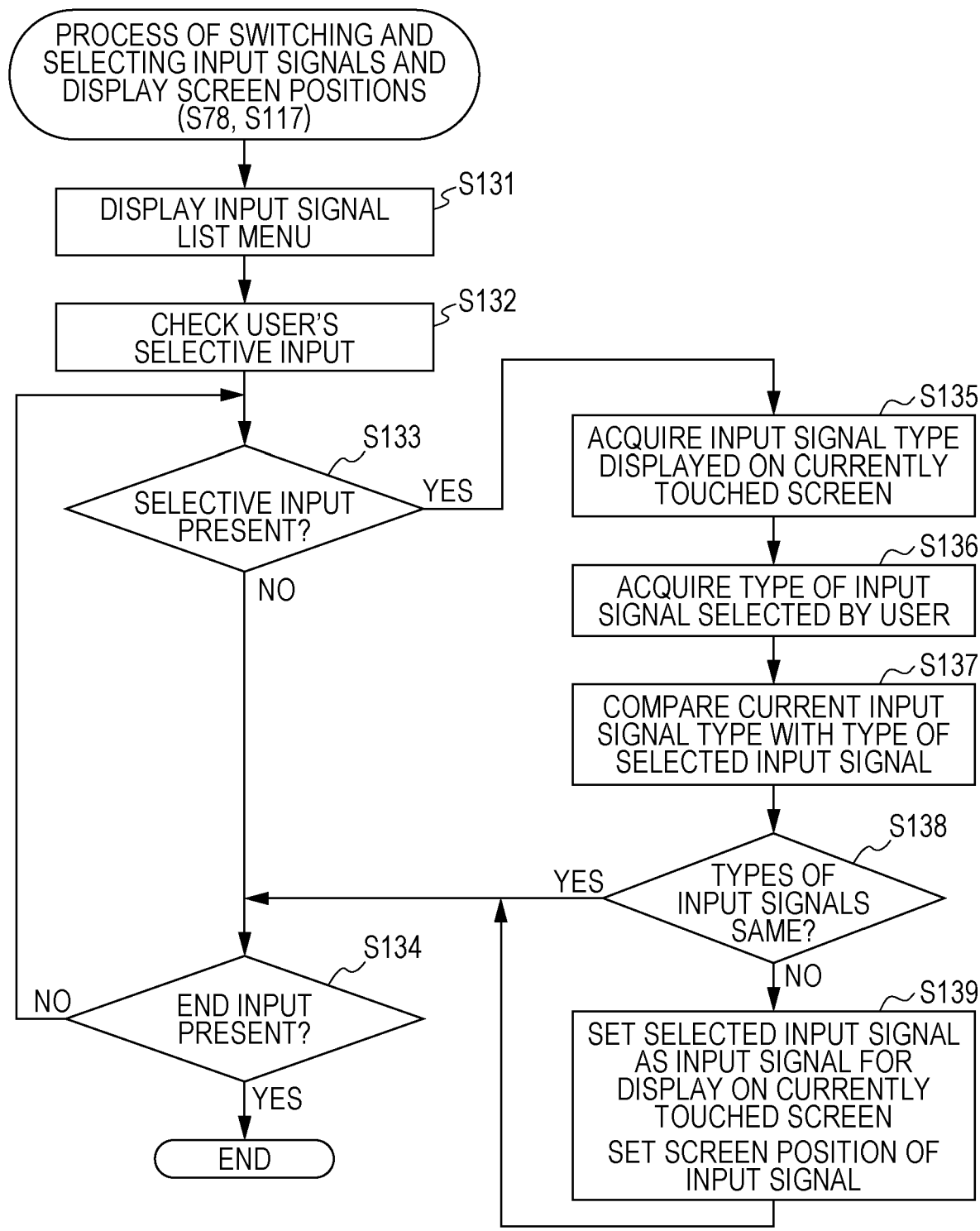
FIG. 21 is a flow chart of an example of a process of switching and selecting input signals and display screen positions according to the embodiment of the present disclosure.

FIG. 21 is a flow chart of an example of a process of switching and selecting input signals and display screen positions according to the embodiment of the present disclosure.

This switching and selecting process is a process that is executed in the aforementioned steps S78 and S117.

In step S131 of FIG. 21, the image display device displays an input signal list menu. For example, the image display device displays such an input signal list menu as that shown in (4) of FIG. 12A. The user sees this input signal list menu and performs an operation of selecting a desired input signal. For example, the user needs only touch a region in which the desired input signal is displayed.

In step S132, the image display device checks for the user's selective input.

In the presence of the user's selective input in step S133, the image display device proceeds to step S135. In the absence of the user's selective input in step S133, the image display device proceeds to step S135.

In step S134, the image display device checks whether the user has performed input that puts an end to the switching and selecting process. Input that puts an end to the switching and selecting process needs only be performed, for example, by pressing a predetermined push-button key.

In a case where input that puts an end to the switching and selecting process has been performed, the image display device ends the process. In a case where input that puts an end to the switching and selecting process has not been performed, the image display device returns to step S133.

In step S135, the image display device acquires, from the storage section 20, the input signal type of the image displayed on the currently touched screen. For example, as shown in (3) of FIG. 12A, the image display device acquires, for the screen G2 on which a flick operation has been performed, the input signal type (DSUB-01) of the screen currently displayed on the screen G2.

In step S136, the image display device acquires the type of an input signal selected by the user.

In step S137, the image display device makes a comparison between the input signal type of the currently touched screen and the type of the input signal selected by the user.

In step S138, the image display device checks, by the aforementioned comparison, whether the types of the two input signals are identical. In a case where the types of the input signals are identical, the image display device proceeds to step S134. In a case where the types of the input signals are different, the image display device proceeds to step S139.

In step S139, the image display device sets, as an input signal representing an image to be displayed on the currently touched screen, the input signal selected by the user. That is, the image display device configures the settings so that the image to be displayed on the touched screen is switched to the image based on the input signal selected by the user.

After that, the image display device proceeds to step S134.

The foregoing has described the flow chart of the process of switching and selecting input signals and display screen positions that is executed in steps S78 and S117.

The present disclosure contains subject matter related to that disclosed in Japanese Priority Patent Application JP 2017-116178 filed in the Japan Patent Office on Jun. 13, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device that is capable of performing a single-screen display and a multiple split display in which a plurality of screens are simultaneously displayed, comprising:
  a processor; and
  a memory storing a program that causes the processor to execute control of the image display device:
  the processor executes following:
    receiving, a plurality of video signals through an input terminal;
    displaying, on a display screen, an image corresponding to a predetermined video signal inputted to the input terminal;
    in a case where a user has performed a touch operation, detecting a position where a touch was started and a position where the touch was released and generating touch information composed of a touch start position and a touch release position;
    storing display screen information including layout information associating a video signal inputted to the input terminal and a position of one or more display screens currently displayed on a display section with each other;
    acquiring, with reference to the touch information, input detection information including information indicating a position of that one of the one or more display screens currently displayed on the display section to which the touch start position and the touch release position belong and information indicating presence or absence of a movement of the user's touch operation;
    judging the user's touch operation with reference to the display screen information and the input detection information thus acquired and determining a screen switching process associated in advance with the touch operation thus judged; and
  executing the screen switching process thus determined.

2. The image display device according to claim 1, wherein the processor further executes:
  judging the user's touch operation with reference to the information indicating the position of the display screen to which the touch start position and the touch release position belong, the presence or absence of the movement of the touch operation as detected from the touch start position and the touch release position, and a direction of movement of the touch operation as detected from a direction of a straight line extending from the touch start position to the touch release position.

3. The image display device according to claim 1, wherein a display mode for identifying whether a screen currently displayed on the display section is a single-screen display or a multiple split display and operation judgment information associating the user's touch operation and a screen switching process with each other are stored in advance in the storage section, and
wherein the processor further executes searching for the operation judgment information and determining a screen switching process associated in advance with the number of screens currently displayed on the display section and the touch operation thus judged.

4. The image display device according to claim 1, wherein the screen switching process includes a number-of display-screens changing process of changing the number of screens that are displayed on the display section, a display position changing process of changing positions of a plurality of split display screens displayed on the display section, and a switching process of switching video signals in order to change from displaying one image to displaying another image on the display screen.

5. The image display device according to claim 1, wherein in a case where a single-screen display is being performed on the display section and in a case where the user's touch operation is judged to be a tap operation in which the touch start position and the touch release position are substantially the same positions or a flick operation in which the touch start position and the touch release position are different positions, the processor further executes performing a screen switching process of switching from the single-screen display to a multiple split display composed of two or more screens.

6. The image display device according to claim 1, wherein in a case where a single-screen display is being performed on the display section and in a case where the user's touch operation is judged to be a swipe operation in which there are two of the touch start positions and two of the touch release positions and the touch start positions and the touch release positions are different positions, the processor further executes performing a screen switching process of switching from the single-screen display to a multiple split display composed of two screens.

7. The image display device according to claim 1, wherein in a case where a multiple split display is being performed on the display section and in a case where the user's touch operation is judged to be a double-tap operation in which the touch start position and the touch release position are substantially the same positions, the processor further executes performing a screen switching process of switching from the multiple split display to a single-screen display.

8. The image display device according to claim 1, wherein in a case where a multiple split display is being performed on the display section and in a case where the user's touch operation is judged to be a flick operation that entails a movement which causes the touch start position and the touch release position to belong to different display screens, the processor further executes performing a screen switching process of interchanging display positions of the respective display screens to which the touch start position and the touch release position belong.

9. The image display device according to claim 1, wherein the display screen information includes the layout information, a display mode for identifying whether a screen currently displayed on the display section is a single-screen display or a multiple split display, and the number of screens currently displayed on the display section.

10. A method of display in an image display device that is capable of performing a single-screen display and a multiple split display in which a plurality of screens are simultaneously displayed, comprising:
receiving a plurality of video signals through an input terminal;
displaying, on a display screen, an image corresponding to a predetermined video signal inputted to the input terminal;
in a case where a user has performed a touch operation, detecting a position where a touch was started and a position where the touch was released and generating touch information composed of a touch start position and a touch release position;
storing display screen information including layout information associating a video signal inputted to the input terminal and a position of one or more display screens currently displayed on a display section with each other;
acquiring, with reference to the touch information, input detection information including information indicating a position of that one of the one or more display screens currently displayed on the display section to which the touch start position and the touch release position belong and information indicating presence or absence of a movement of the user's touch operation;
judging the user's touch operation with reference to the display screen information and the input detection information thus acquired and determining a screen switching process associated in advance with the touch operation thus judged; and
executing the screen switching process thus determined.

11. A non-transitory recording medium storing thereon a computer program for causing a computer mounted in an image display device that is capable of performing a single-screen display and a multiple split display in which a plurality of screens are simultaneously displayed to execute a method comprising:
receiving a plurality of video signals through an input terminal;
displaying, on a display screen, an image corresponding to a predetermined video signal inputted to the input terminal;
in a case where a user has performed a touch operation, detecting a position where a touch was started and a position where the touch was released and generating touch information composed of a touch start position and a touch release position;
storing display screen information including layout information associating a video signal inputted to the input terminal and a position of one or more display screens currently displayed on a display section with each other;
acquiring, with reference to the touch information, input detection information including information indicating a position of that one of the one or more display screens currently displayed on the display section to which the touch start position and the touch release position belong and information indicating presence or absence of a movement of the user's touch operation;
judging the user's touch operation with reference to the display screen information and the input detection information thus acquired and determining a screen switching process associated in advance with the touch operation thus judged; and
executing the screen switching process thus determined.

* * * * *